US012402080B2

(12) United States Patent
Elshafie et al.

(10) Patent No.: US 12,402,080 B2
(45) Date of Patent: Aug. 26, 2025

(54) POWER CONTROL TECHNIQUES FOR SIDELINK COMMUNICATIONS

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US); Peter Gaal, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/507,499

(22) Filed: Oct. 21, 2021

(65) Prior Publication Data

US 2023/0126206 A1    Apr. 27, 2023

(51) Int. Cl.
*H04W 52/14*   (2009.01)
*H04W 24/10*   (2009.01)
(Continued)

(52) U.S. Cl.
CPC .......... *H04W 52/14* (2013.01); *H04W 24/10* (2013.01); *H04W 52/365* (2013.01); *H04W 52/367* (2013.01); *H04B 7/0426* (2013.01)

(58) Field of Classification Search
CPC ... H04W 52/14; H04W 24/10; H04W 52/365; H04W 52/367; H04W 52/383; H04B 7/0426
See application file for complete search history.

(56) References Cited

U.S. PATENT DOCUMENTS

| 11,382,046 B2 * | 7/2022 | Wang | H04W 52/242 |
| 2020/0022089 A1 * | 1/2020 | Guo | H04W 52/242 |

(Continued)

FOREIGN PATENT DOCUMENTS

| EP | 3637876 A1 | 4/2020 |
| WO | WO-2021026715 A1 | 2/2021 |

OTHER PUBLICATIONS

International Search Report and Written Opinion—PCT/US2022/041083—ISA/EPO—Dec. 5, 2022.

*Primary Examiner* — Faruk Hamza
*Assistant Examiner* — Aixa A Guadalupe Cruz
(74) *Attorney, Agent, or Firm* — Holland & Hart / QUALCOMM Incorporated

(57) ABSTRACT

Methods, systems, and devices for wireless communications are described. For example, a UE may determine a power control adjustment based on sidelink messages received from other UEs. The UE may transmit, to the other UEs, an indication of the power control adjustment to the other UEs. The other UEs may transmit additional sidelink messages in accordance with the power control adjustment, such that power levels of the additional sidelink message satisfy a threshold. A base station may indicate a power control adjustment to one or more UEs. For example, the base station may receive power control information associated with sidelink communications between a set of UEs. The base station may transmit an indication of a power adjustment parameter for a transmit power level for sidelink messages transmitted between two UEs of the set. The value of the power adjustment parameter may be based on the received power control information.

17 Claims, 17 Drawing Sheets

(51) Int. Cl.
*H04W 52/36* (2009.01)
*H04B 7/0426* (2017.01)

(56) References Cited

U.S. PATENT DOCUMENTS

| | | | | |
|---|---|---|---|---|
| 2021/0410084 A1* | 12/2021 | Li | ........................ | H04W 52/265 |
| 2022/0030523 A1* | 1/2022 | Wang | .................. | H04W 52/243 |
| 2023/0239807 A1* | 7/2023 | Zeng | ................. | H04W 52/0216 |
| | | | | 455/522 |

* cited by examiner

POWER CONTROL TECHNIQUES FOR SIDELINK COMMUNICATIONS

FIELD OF TECHNOLOGY

The following relates to wireless communications, including power control techniques for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support multi-user multiple input multiple output (MU-MIMO). In such systems, some communication devices may simultaneously communicate with a common communication device over the same resources. However, signals communicated to the common communication device may be received at relatively different power levels. In such cases, the common communication device may experience reduced communications throughput and performance.

SUMMARY

The described techniques relate to improved methods, systems, devices, and apparatuses that support power control techniques for sidelink communications. Generally, a communications device (e.g., a user equipment (UE) or a base station) may employ power control techniques to reduce or avoid signal processing distortions. For example, a first UE may indicate a power control adjustment to a second UE and/or a third UE. In some examples, the first UE may determine the power control adjustment based on sidelink messages received from each of the second UE and the third UE. For example, the first UE may measure the power level of sidelink messages received from the second UE and the third UE. The first UE may transmit, to the second UE and/or the third UE, at least one indication of a power adjustment parameter for adjusting the transmit power level at the respective UE. The indication may allow the second UE and the third UE to transmit additional sidelink messages in accordance with the power adjustment parameter, for example, such that power levels of the additional sidelink message have been adjusted to where the first UE may better handle the messages for correct quantization and/or processing.

Additionally, or alternatively, a base station may indicate a power control adjustment to one or more UEs. For example, the base station may receive power control information associated with sidelink communications between a set of UEs (e.g., the first UE, the second UE, and the third UE). The base station may transmit a grant scheduling the transmission of a first sidelink message from the second UE to the first UE and a second sidelink message from the third UE to the first UE. The scheduled transmissions may occur on the same sidelink channel resources. In some examples, the base station may transmit at least one indication of a power adjustment parameter for a transmit power level for the first sidelink message or the second sidelink message to the respective UE. The value of the power adjustment parameter may be based on the received power control information (e.g., such that a receiving UE receives the first and second sidelink messages with respective power levels that have been adjusted to where the first UE may better handle the messages for correct quantization and/or processing).

A method for wireless communications at a first UE is described. The method may include measuring a first power level of a first sidelink message received from a second UE, measuring a second power level of a second sidelink message from a third UE, and transmitting, to at least one of the second UE or the third UE, an indication of one or more power adjustment parameters for adjustment of a transmit power, the indication being based on the first power level and the second power level.

An apparatus for wireless communications at a first UE is described. The apparatus may include a processor, memory coupled with the processor, and instructions stored in the memory. The instructions may be executable by the processor to cause the apparatus to measure a first power level of a first sidelink message received from a second UE, measure a second power level of a second sidelink message from a third UE, and transmit, to at least one of the second UE or the third UE, an indication of one or more power adjustment parameters for adjustment of a transmit power, the indication being based on the first power level and the second power level.

Another apparatus for wireless communications at a first UE is described. The apparatus may include means for measuring a first power level of a first sidelink message received from a second UE, means for measuring a second power level of a second sidelink message from a third UE, and means for transmitting, to at least one of the second UE or the third UE, an indication of one or more power adjustment parameters for adjustment of a transmit power, the indication being based on the first power level and the second power level.

A non-transitory computer-readable medium storing code for wireless communications at a first UE is described. The code may include instructions executable by a processor to measure a first power level of a first sidelink message received from a second UE, measure a second power level of a second sidelink message from a third UE, and transmit, to at least one of the second UE or the third UE, an indication of one or more power adjustment parameters for adjustment of a transmit power, the indication being based on the first power level and the second power level.

Some examples of the method, apparatuses, and non-transitory computer-readable medium described herein the indication may be based on a difference between the first power level and the second power level failing to satisfy a threshold.

In some examples of the method, apparatuses, and non-transitory computer-readable medium described herein, transmitting the indication may include operations, features, means, or instructions for transmitting an indication of a first power adjustment parameter for the adjustment of the transmit power relative to an initial transmit power, or relative to a second power adjustment parameter, or a combination thereof.

Some examples of the method, apparatuses, and non-transitory computer-readable medium described herein may further include operations, features, means, or instructions for communicating an indication to terminate multiple user multiple input multiple output (MU-MIMO) communications based on a power control failure.

In some examples of the method, apparatuses, and non-transitory computer-readable medium described herein, communicating the indication to terminate the MU-MIMO communications may include operations, features, means, or instructions for transmitting the indication to terminate the MU-MIMO communications to the second UE, the third UE, or both and receiving the indication to terminate the MU-MIMO communications from a base station.

In some examples of the method, apparatuses, and non-transitory computer-readable medium described herein, the indication to terminate the MU-MIMO communications includes a bit corresponding to a respective UE indicating to transmit on a same sidelink channel resource or to refrain from transmitting on the same sidelink channel resource.

Some examples of the method, apparatuses, and non-transitory computer-readable medium described herein may further include operations, features, means, or instructions for receiving the first sidelink message indicating first power control information, the first power control information including a first power headroom of the second UE, a sidelink transmit power of the second UE, a maximum sidelink transmit power of the second UE, or any combination thereof and receiving the second sidelink message indicating second power control information, the second power control information including a second power headroom of the third UE, a sidelink transmit power of the third UE, a maximum sidelink transmit power of the third UE, or any combination thereof, where transmitting the indication of the one or more power adjustment parameters is based on the first power control information and the second power control information.

Some examples of the method, apparatuses, and non-transitory computer-readable medium described herein may further include operations, features, means, or instructions for receiving the first sidelink message and the second sidelink message via dedicated sidelink shared channel resources, sidelink medium access control control elements (MAC-CEs), sidelink control information (SCI), or any combination thereof.

In some examples of the method, apparatuses, and non-transitory computer-readable medium described herein, transmitting the indication may include operations, features, means, or instructions for transmitting, to the third UE, the indication based on the second UE initiating a third sidelink message before an initiation of a fourth sidelink message from the third UE.

In some examples of the method, apparatuses, and non-transitory computer-readable medium described herein, transmitting the indication may include operations, features, means, or instructions for transmitting the indication via dedicated sidelink shared channel resources, sidelink feedback channel resources, or any combination thereof.

A method for wireless communications at a second UE is described. The method may include transmitting a first sidelink message via a sidelink to a first UE, receiving an indication of a power adjustment parameter for adjustment of a transmit power at the second UE based on the first sidelink message, and transmitting, to the first UE, a second sidelink message in accordance with the power adjustment parameter, the second sidelink message communicated on a same sidelink channel resource as a third sidelink message from a third UE.

An apparatus for wireless communications at a second UE is described. The apparatus may include a processor, memory coupled with the processor, and instructions stored in the memory. The instructions may be executable by the processor to cause the apparatus to transmit a first sidelink message via a sidelink to a first UE, receive an indication of a power adjustment parameter for adjustment of a transmit power at the second UE based on the first sidelink message, and transmit, to the first UE, a second sidelink message in accordance with the power adjustment parameter, the second sidelink message communicated on a same sidelink channel resource as a third sidelink message from a third UE.

Another apparatus for wireless communications at a second UE is described. The apparatus may include means for transmitting a first sidelink message via a sidelink to a first UE, means for receiving an indication of a power adjustment parameter for adjustment of a transmit power at the second UE based on the first sidelink message, and means for transmitting, to the first UE, a second sidelink message in accordance with the power adjustment parameter, the second sidelink message communicated on a same sidelink channel resource as a third sidelink message from a third UE.

A non-transitory computer-readable medium storing code for wireless communications at a second UE is described. The code may include instructions executable by a processor to transmit a first sidelink message via a sidelink to a first UE, receive an indication of a power adjustment parameter for adjustment of a transmit power at the second UE based on the first sidelink message, and transmit, to the first UE, a second sidelink message in accordance with the power adjustment parameter, the second sidelink message communicated on a same sidelink channel resource as a third sidelink message from a third UE.

In some examples of the method, apparatuses, and non-transitory computer-readable medium described herein, transmitting the second sidelink message may include operations, features, means, or instructions for transmitting the second sidelink message associated with a first power level, where a difference between the first power level and a second power level associated with the third sidelink message satisfies a threshold based on receiving the indication.

In some examples of the method, apparatuses, and non-transitory computer-readable medium described herein, receiving the indication may include operations, features, means, or instructions for receiving an indication of a first power adjustment parameter for the adjustment of the transmit power relative to an initial transmit power or relative to a second power adjustment parameter or a combination thereof.

Some examples of the method, apparatuses, and non-transitory computer-readable medium described herein may further include operations, features, means, or instructions for receiving, from the first UE or a base station, an indication to terminate MU-MIMO communications based on a power control failure.

In some examples of the method, apparatuses, and non-transitory computer-readable medium described herein, the indication to terminate the MU-MIMO communications includes a bit corresponding to a respective UE indicating to transmit on the same sidelink channel resource or to refrain from transmitting on the same sidelink channel resource.

In some examples of the method, apparatuses, and non-transitory computer-readable medium described herein, transmitting the first sidelink message may include operations, features, means, or instructions for transmitting the first sidelink message indicating power control information, the power control information including a power headroom of the second UE, a sidelink transmit power of the second UE, a maximum sidelink transmit power of the second UE, or any combination thereof.

In some examples of the method, apparatuses, and non-transitory computer-readable medium described herein, transmitting the first sidelink message may include operations, features, means, or instructions for transmitting the first sidelink message via dedicated sidelink shared channel resources, sidelink MAC-CEs, SCI, or any combination thereof.

In some examples of the method, apparatuses, and non-transitory computer-readable medium described herein, receiving the indication may include operations, features, means, or instructions for receiving, from the first UE, the indication based on the third UE initiating the third sidelink message before an initiation of the second sidelink message.

In some examples of the method, apparatuses, and non-transitory computer-readable medium described herein, receiving the indication may include operations, features, means, or instructions for receiving the indication via dedicated sidelink shared channel resources, sidelink feedback channel resources, or any combination thereof.

A method for wireless communications at a base station is described. The method may include receiving power control information associated with a set of sidelinks for communications between a set of UEs, the set of UEs including at least a second UE and a third UE, transmitting a grant scheduling transmission of a first sidelink message from the second UE to a first UE and a second sidelink message from the third UE to the first UE on a same sidelink channel resource, and transmitting, to the second UE, the third UE, or both, at least one indication of one or more power adjustment parameters for adjustment of a transmit power for the first sidelink message, the second sidelink message, or both, based on receiving the power control information.

An apparatus for wireless communications at a base station is described. The apparatus may include a processor, memory coupled with the processor, and instructions stored in the memory. The instructions may be executable by the processor to cause the apparatus to receive power control information associated with a set of sidelinks for communications between a set of UEs, the set of UEs including at least a second UE and a third UE, transmit a grant scheduling transmission of a first sidelink message from the second UE to a first UE and a second sidelink message from the third UE to the first UE on a same sidelink channel resource, and transmit, to the second UE, the third UE, or both, at least one indication of one or more power adjustment parameters for adjustment of a transmit power for the first sidelink message, the second sidelink message, or both, based on receiving the power control information.

Another apparatus for wireless communications at a base station is described. The apparatus may include means for receiving power control information associated with a set of sidelinks for communications between a set of UEs, the set of UEs including at least a second UE and a third UE, means for transmitting a grant scheduling transmission of a first sidelink message from the second UE to a first UE and a second sidelink message from the third UE to the first UE on a same sidelink channel resource, and means for transmitting, to the second UE, the third UE, or both, at least one indication of one or more power adjustment parameters for adjustment of a transmit power for the first sidelink message, the second sidelink message, or both, based on receiving the power control information.

A non-transitory computer-readable medium storing code for wireless communications at a base station is described. The code may include instructions executable by a processor to receive power control information associated with a set of sidelinks for communications between a set of UEs, the set of UEs including at least a second UE and a third UE, transmit a grant scheduling transmission of a first sidelink message from the second UE to a first UE and a second sidelink message from the third UE to the first UE on a same sidelink channel resource, and transmit, to the second UE, the third UE, or both, at least one indication of one or more power adjustment parameters for adjustment of a transmit power for the first sidelink message, the second sidelink message, or both, based on receiving the power control information.

In some examples of the method, apparatuses, and non-transitory computer-readable medium described herein, the indication may be based on a difference between the first power level and the second power level failing to satisfy a threshold.

In some examples of the method, apparatuses, and non-transitory computer-readable medium described herein, receiving the power control information may include operations, features, means, or instructions for receiving, from the first UE, the power control information including an identifier of the first UE, channel state information of one or more sidelinks, one or more power measurements, or any combination thereof.

In some examples of the method, apparatuses, and non-transitory computer-readable medium described herein, transmitting the at least one indication may include operations, features, means, or instructions for transmitting the at least one indication of a maximum power, a target received power at the first UE, a target transmit power for the first sidelink message, the second sidelink message, or both, or any combination thereof.

Some examples of the method, apparatuses, and non-transitory computer-readable medium described herein may further include operations, features, means, or instructions for transmitting at least one indication to terminate MU-MIMO communications based on the power control information failing to satisfy one or more thresholds.

DETAILED DESCRIPTION

Figure 1:
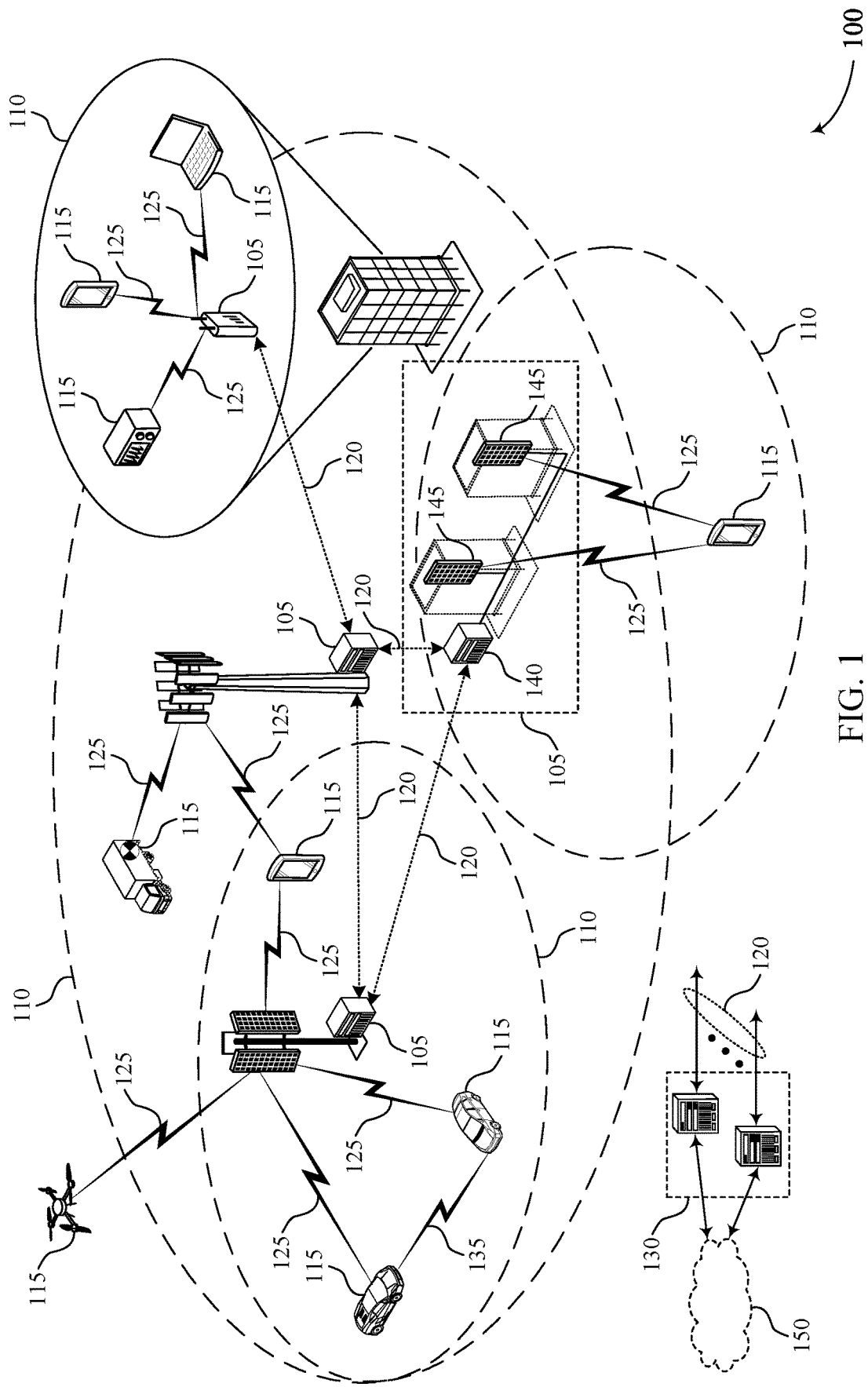
FIGS. 1 through 3 each illustrate an example of a wireless communications system that supports power control techniques for sidelink communications in accordance with aspects of the present disclosure.

Some wireless communications systems may support multi-user multiple input multiple output (MU-MIMO). In such systems, multiple communication devices (e.g., user equipments (UEs)) may simultaneously communicate with a common communication device (e.g., another UE, a base station, or other communication devices). For example, a first UE may receive sidelink communications (e.g., signals) transmitted from a second UE and a third UE over shared resources (e.g., time-frequency resources). In such an example, the first UE may balance the receive power of signals transmitted from the second and third UE to reduce or avoid signal distortions during decoding. In some examples, however, the quantized (e.g., rounded) power level of signals transmitted from one UE may differ from the quantized power level of signals transmitted from the other UE, such that the receive power of the respective signals may not be properly balanced. For example, if the quantized power level of a signal transmitted from the second UE is larger than the quantized power level of a signal transmitted from the third UE, changes in the signal transmitted from the third UE may be within the error limit of the signal transmitted from the second UE. As such, changes in the signal transmitted from the third UE may be observed by the first UE as noise and the signal may not be properly decoded. Additionally, or alternatively, if the first UE adjusts the power level of the signal from the third UE, the signal from the second UE may become distorted. In such examples, throughput and reliability of wireless communications between the UEs may be degraded.

Various aspects of the present disclosure relate to power control techniques for sidelink communications. For example, a communications device (e.g., a UE or a base station or both) may employ power control techniques to reduce or avoid signal distortions during digital processing. For example, a UE (e.g., a first UE) may manage the individual power levels at other UEs (e.g., a second UE and a third UE) such that the received power level of signals transmitted from the other UEs may be balanced (e.g., a difference between the power levels may satisfy a threshold) at the receiving UE. In some examples, the first UE may manage the power levels of the second UE and the third UE via control signaling. For example, the first UE may transmit control signaling to the second UE or the third UE indicating an adjustment to the power level at the respective UE (e.g., a power adjustment parameter). In some examples, the second UE and third UE may each indicate power control information (e.g., power headroom, maximum transmit power, a current transmit power, and the like) to the first UE to assist the first UE in identifying the power level adjustment. Additionally, or alternatively, the first UE may obtain a power measurement from sidelink messages from the second UE and third UE, respectively, and transmit a power adjustment parameter based on the measurements.

In some other examples, the second UE may measure the power level of sidelink communications transmitted from the third UE and autonomously adjust the transmit power level at the second UE to be balanced with the third UE. That is, the second UE may adjust its power level to satisfy a threshold, for example, without receiving an indication of the adjustment from the first UE. Additionally, or alternatively, a base station may manage the individual power levels at the second UE and the third UE. For example, a UE (e.g., the first UE, the second UE, or the third UE) may report power control information, an indicator of a receiving UE, and the like to the base station. In some examples, the base station may indicate, to the second UE or the third UE, an adjustment to the transmit power level at the respective UE such that signals transmitted from the second UE and the third UE may be balanced at the first UE.

In some examples, a power control failure may occur and the first UE may determine that balanced power levels are unachievable while maintaining communications of a threshold quality. For example, the first UE may determine that the power level of signals transmitted from the second UE may not be adjusted to a power level that is comparable with the power level of signals transmitted from the third UE. In some such examples, the first UE (e.g., or the base station) may terminate MU-MIMO for both the second UE and the third UE. In such an example, the UE which initiated the MU-MIMO communications (e.g., the second UE or the third UE) may transmit on the resources reserved for the shared communications (e.g., the reserved resources) while the other UE may refrain from transmitting on the same resources based on receiving the indication to terminate MU-MIMO communications from the first UE or the base station. In some examples, a bitmap may be used to indicate whether the second UE or the third UE may transmit on the reserved resources.

Particular aspects of the subject matter described herein may be implemented to realize one or more of the following potential advantages. The techniques employed by the described communication devices may provide benefits and enhancements to the operation of the communication devices, including reducing the likelihood of signal distortions during digital processing. For example, the described techniques may support improvements in wireless communications systems by increasing network throughput. Further, power control techniques for sidelink communications, as described herein, may support higher data rates, thereby improving latency and reliability. As such, the described techniques may result in improved network operations and network work efficiencies, among other benefits.

Aspects of the disclosure are initially described in the context of wireless communications systems. Aspects of the disclosure are then described in the context of example process flows. Aspects of the disclosure are further illustrated by and described with reference to apparatus diagrams, system diagrams, and flowcharts that relate to power control techniques for sidelink communications.

FIG. 1 illustrates an example of a wireless communications system 100 that supports power control techniques for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

The wireless communications system 100 may support one or more aspects of power control techniques for sidelink communications. For example, a first UE 115 may indicate a power control adjustment to a second UE 115 and a third UE 115. In some examples, the first UE 115 may determine the power control adjustment based on measuring the power level of sidelink messages received from the second UE 115 and the third UE 115. In some other examples, the first UE 115 may determine the power control adjustment based on sidelink messages from the second UE 115 and the third UE 115 indicating power control information for the respective UE 115. The first UE 115 may indicate one or more power adjustment parameters to the second UE 115 or the third UE 115 and, in response, the second UE 115 and the third UE 115 may transmit additional sidelink messages in accordance with the power adjustment parameter. For example, the power levels of the additional sidelink messages transmitted from the second UE 115 and the third UE 115 may be comparable, within a threshold, at the first UE 115.

Additionally, or alternatively, a base station 105 may indicate a power control adjustment to one or more UEs 115. For example, the base station 105 may receive power control information associated with sidelink communications between a set of UEs (e.g., the first UE 115, the second UE 115, and the third UE 115). The base station may then transmit a grant (e.g., DCI) scheduling the transmission of a first sidelink message from the second UE 115 to the first UE 115 and a second sidelink message from the third UE 115 to the first UE 115. The scheduled transmissions may occur on the same sidelink channel resources. In some examples, the base station 105 may then transmit at least one indication of a power adjustment parameter to a transmit power level for the first sidelink message or the second sidelink message to the respective UE 115. The value of the power adjustment parameter may be based on the received power control information.

Figure 2:
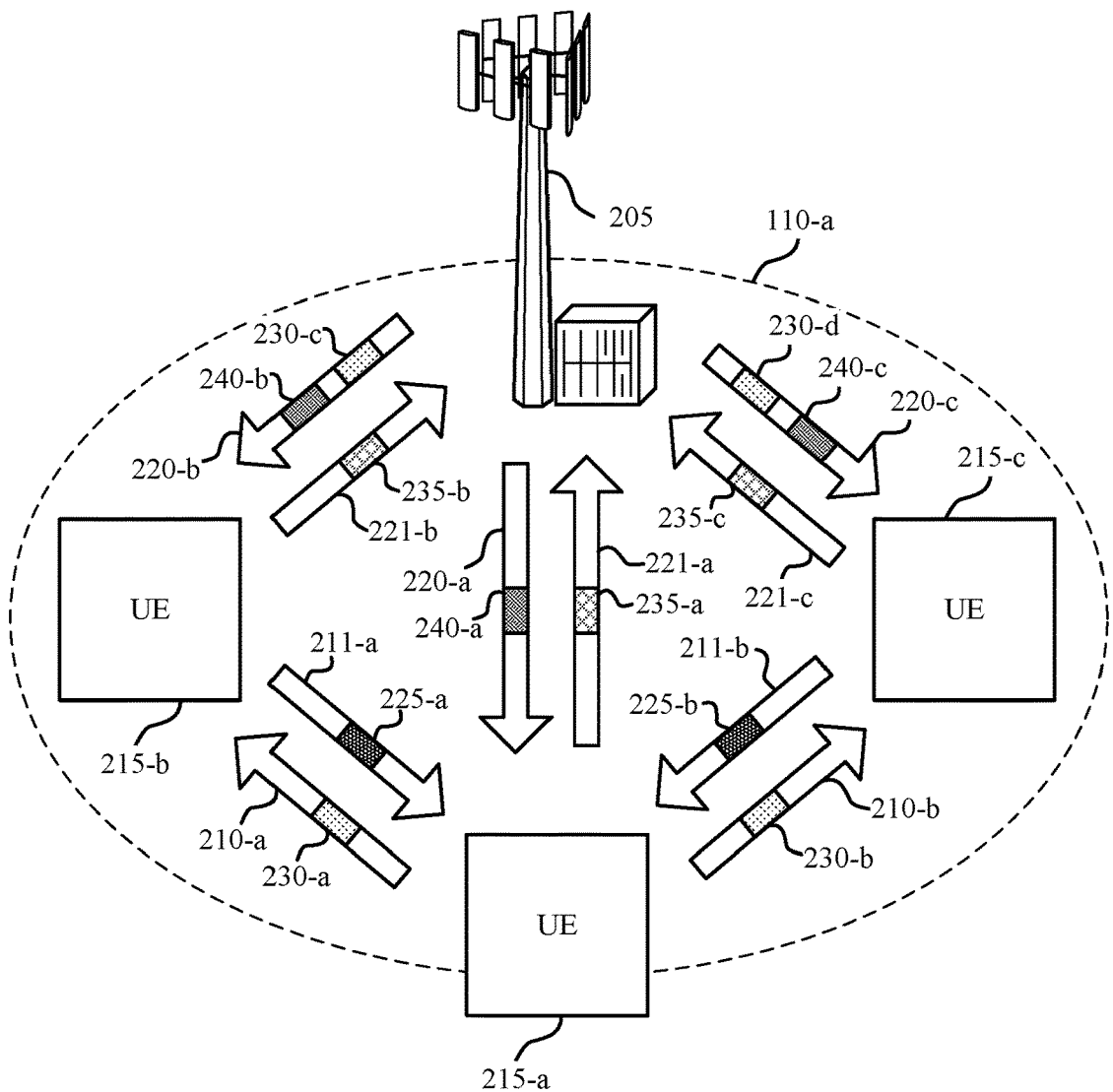

FIG. 2 illustrates an example of a wireless communications system 200 that supports power control techniques for sidelink communications in accordance with aspects of the present disclosure. In some examples, the wireless communications system 200 may implement aspects of the wireless communications system 100. For example, the wireless communications system 200 may include a base station 205 which may be an example of a base station 105 described with reference to FIG. 1. The wireless communications system 200 may also include a UE 215-*a*, a UE 215-*b*, and a UE 215-*c*, which may be examples of a UE 115 described with reference to FIG. 1. The UEs 215 and the base station 205 may communicate within a geographic coverage area 110-*a* which may be an example of a geographic coverage area 110 described with reference to FIG. 1.

The UE 215-*a* may communicate with the UE 215-*b* via a communication link 210-*a* and a communication link 211-*a* and may communicate with the UE 215-*b* via a communication link 210-*b* and a communication link 211-*b*. In some examples, the communication links 210 and the communication links 211 may be sidelinks. The base station 205 may communicate with the UEs 215 via one or more communication links 220 (e.g., a communication link 220-*a*, a communication link 220-*b*, and a communication link 220-*c*) and one or more communication links 221 (e.g., a communication link 221-*a*, a communication link 221-*b*, and a communication link 221-*c*). In some examples, the communication links 220 may be downlinks and the communication links 221 may be uplinks.

The wireless communications system 200 may support MU-MIMO communications. For example, communication devices operating within the wireless communications system 200 (e.g., the UE 215-*b* and the UE 215-*c*) may simultaneously communicate with a common communication device (e.g., the UE 215-*a* or the base station 205) over the same resources (e.g., shared time-frequency resources). In some examples, signals communicated to the common communication device may be received at relatively different power levels. For example, when two signals are added up with different power levels, the outer and inner loops of the automatic gain control (AGC) at the common communication device may not manage both signals to achieve suitable quantization and processing (e.g., in the fast Fourier transform or other signal processing blocks). As such, the digital processing performance may be adjusted based on a desired signal. In some other examples, however, the UE 215-*b* and the UE 215-*c* (e.g., the transmitting UEs) may each share the respective power-head rooms of the UE 215-*b* and the UE 215-*c* and the UE 215-*a* (e.g., the receiving UE) may transmit one or more power control commands to the UE 215-*b* and the UE 215-*c* to manage the individual power levels (e.g., at the UE 215-*b* and the UE 215-*c*) of superimposed received signals, for example, to reduce or avoid AGC and digital processing distortions. In other words, the UE 215-*a* may manage the individual power levels at the UE 215-*b* and the UE 215-*c* such that the received power level of signals transmitted from the UE 215-*b* and the UE 215-*c* may be balanced (e.g., comparable within a threshold) at the UE 215-*a*. Stated alternatively, a difference between the respective power levels of any quantity of signals may satisfy a threshold. The threshold may be pre-configured at the UE 215-*a* (or the base station 205), indicated by control signaling, and the like.

As an illustrative example, the UE 215-*a* may measure a first power level of a sidelink message 225-*a* transmitted from the UE 215-*b* and a second power level of a sidelink message 225-*b* transmitted from the UE 215-*c*. Measuring the power levels may include obtaining one or more power metrics (e.g., the UE 215-*a* may measure a reference signal received power (RSRP) or other power metric of each sidelink message). Additionally the UE 215-*a* may receive power control information indicating the one or more power metrics in a respective sidelink message, or any combination thereof. In some examples, the UE 215-*a* may transmit, to at least one of the UE 215-*b* or the UE 215-*c*, an indication of one or more power adjustment parameters for adjustment of a transmit power. For example, the UE 215-*a* may transmit a power adjustment indication 230-*a* to the UE 215-*b* or a power adjustment indication 230-*b* to the UE 215-*c*. In some examples, the power adjustment indications 230 may be based on the first power level and the second power level.

Additionally, or alternatively, the sidelink message 225-*a* and the sidelink message 225-*b* may include an indication of power control information (e.g., power headroom, maximum transmit power, a current transmit power, and the like) for the UE 215-*b* and the UE 215-*c*, respectively. In some examples, the power adjustment indication 230-*a* and the power adjustment indication 230-*b* may be based on the control information indicated by the sidelink message 225-*a* and the sidelink message 225-*b*, respectively. In some examples, the power control information may be used as basis for determining whether MIMO should be enabled or disabled. In response to receiving a power adjustment indication (e.g., the power adjustment indication 230-*a* or the power adjustment indication 230-*b*), the UE 215-*b* and the UE 215-*c* may transmit one or more additional sidelink messages 225 (not shown) to the UE 215-*a* on one or more shared sidelink channel resources. The one or more additional sidelink messages 225 may be transmitted in accordance with a power adjustment parameter indicated via a power adjustment indication (e.g., the power adjustment indication 230-*a* or the power adjustment indication 230-*b*).

In another example, the base station 205 may manage the individual power levels at the UE 215-*b* and the UE 215-*c*, such that the received power level of signals transmitted from the UE 215-*b* and the UE 215-*c* may be balanced at the UE 215-*a*. For example, the base station 205 may receive power control information (e.g., power control information 235-*a*, power control information 235-*b*, or power control information 235-*c*) associated with a set of sidelinks for communications between the UE 215-*a*, the UE 215-*b*, and the UE 215-*c*. The base station 205 may transmit a grant (e.g., a scheduling grant 240-*a*, a scheduling grant 240-*b*, or a scheduling grant 240-*c*) scheduling transmission of a first sidelink message from the second UE to a first UE and a second sidelink message from the third UE to the first UE on a same sidelink channel resource. The base station 205 may also transmit at least one indication of one or more power adjustment parameters for adjustment of a transmit power for the first sidelink message, the second sidelink message, or both, based on receiving one or more of the power control information 235. For example, the base station may transmit the power adjustment indication 230-*c* to the UE 215-*b* or the power adjustment indication 230-*d* to the UE 215-*c*, such that the received power levels of first sidelink message and the second sidelink message (not shown) may be balanced at the UE 215-*a*. Thus, managing of the individual power levels of the UE 215-*b* and the UE 215-*c* by the UE 215-*a* or the base station 205 may result in improved network operations and network work efficiencies, among other benefits.

Although the wireless communications system 200 depicts three UEs 215 for illustrative clarity, it is to be understood that the techniques described herein may be applied for any quantity of UEs 215. For example, the UE 215-*a* may manage power for more than two UEs 215 transmitting MU-MIMO communications.

Figure 3:
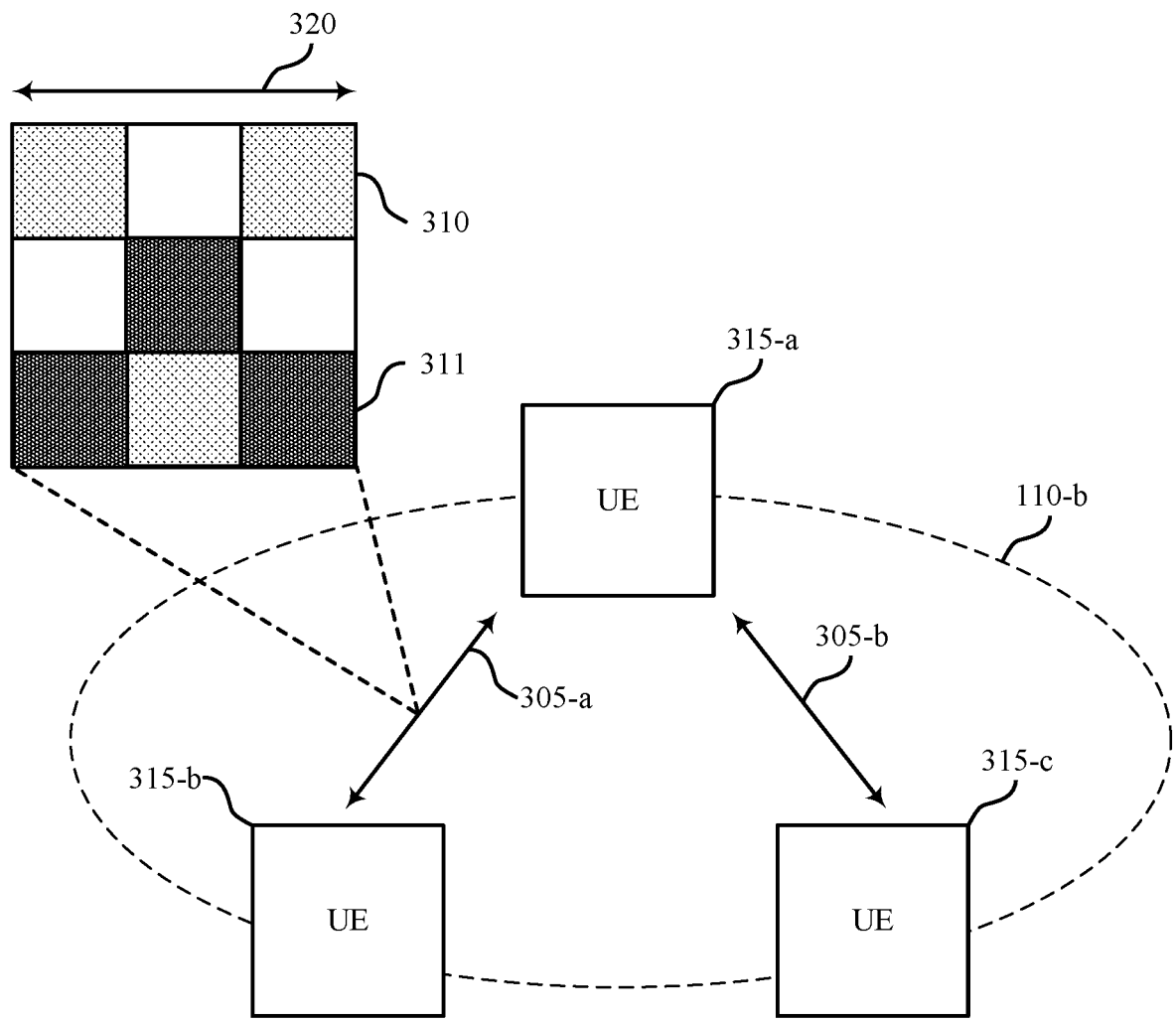

FIG. 3 illustrates an example of a wireless communications system 300 that supports power control techniques for sidelink communications in accordance with aspects of the present disclosure. In some examples, the wireless communications system 300 may implement aspects of the wireless communications systems 100 and 200. For example, the wireless communications system 300 may include a UE 315-*a*, a UE 315-*b*, and a UE 315-*c*, which may be examples of a UE 215 described with reference to FIG. 2 and a UE 115 described with reference to FIG. 1. The UEs 315 may communicate within a geographic coverage area 110-*b* which may be an example of a geographic coverage area 110 described with reference to FIG. 1. The UE 315-*b* and the UE 315-*c* may communicate with the UE 315-*a* via a communication link 305 (e.g., a communication link 305-*a* and a communication link 305-*b*). In some examples of the wireless communications system 300, the communication link 305-*a* and the communication link 305-*b* may be sidelinks.

In some examples, the wireless communications system 300 may support MU-MIMO for improving resource efficiency. For example, a primary UE may transmit communications on shared resources (e.g., time-frequency resources occurring in a resource selection window 320) to multiple remote UEs. Similarly, multiple remote UEs may transmit communications on shared resources to a common (e.g., primary) UE. For example, the UE 315-*b* may transmit communications to the UE 315-*a* via the resources 310 and the UE 315-*c* may transmit communications to the UE 315-*a* via the resources 311 or both the UE 315-*b* and the UE 315-*c* may transmit communications via the resources 311 or the resources 310. In some examples, the primary UE (e.g., the UE 315-*a*) may guide the remote UEs (e.g., the UE 315-*b* and the UE 315-*c*) to transmit on one or more indicated ports. For example, the UE 315-*a* (e.g., or a base station, not shown) may schedule the UE 315-*b* and the UE 315-*c* to transmit on shared resources, such that the signals may be transmitted simultaneously, while still being distinguishable at the UE 315-*a*. Stated alternatively, assuming that the primary UE (e.g., or a base station operating in a sidelink Mode 1) is scheduling one or more other UEs (e.g., remote UEs), the remote UEs may be instructed to transmit on the same resources, while ensuring separability at the receiver (e.g., the primary UE).

As an illustrative example, the wireless communications system 300 includes resources 310 and resources 311. In the example of FIG. 3, the resources 310 and the resources 311 may each include three time-frequency resources in the resource selection window 320. However, it is to be understood that the resources 310 and the resource 311 may include any quantity or type of resource, and the examples described herein should not be considered limiting to the scope covered by the claims or the disclosure. In some examples, the UEs 315 may communicate using orthogonal resources. For example, the UE 315-*b* may transmit communications to the UE 315-*a* over the resources 310 and the UE 315-*c* may transmit communications to the UE 315-*a* over the resources 311 that are orthogonal to the resources 310 in the resource selection window 320. In some other examples, the UEs 315 may support MU-MIMO communications. For example, the UE 315-*b* and the UE 315-*c* may both transmit communications on the same resources 311. By transmitting on the same resources 311, the wireless communications system 300 may realize relatively high data throughput, improved resource utilization, or both. However, such MU-MIMO communications may include signals from each UE 315 being superimposed on each other when received at the UE 315-*a*, which may result in poor processing performance, errors, or both (e.g., if a power level of each signal is relatively different as described herein).

In some examples, a UE (e.g., one or more UEs 315) may determine the power level of a sidelink transmission according to one or more parameters. For example, the UE may determine a power (e.g., $P_{PSSCH,b,c}(i)$) for a transmission over a sidelink shared channel (e.g., a physical sidelink shared channel (PSSCH) transmission) on a resource pool in symbols where a corresponding transmission over a sidelink control channel (e.g., a physical sidelink control channel (PSCCH)) may not be transmitted (e.g., a PSCCH-PSSCH transmission occasion) according to the following equation:

$$P_{PSSCH,b,c}(i)=\min(P_{CMAX},P_{MAX,CBR},\min(P_{PSSCH,D}(i), P_{PSSCH,SL}(i))) \text{ [dBm]} \quad (1)$$

where i may be a PSCCH-PSSCH transmission occasion and $P_{CMAX}$ may be predefined. In some examples, $P_{MAX,CBR}$ may be determined by a value of an instruction element (IE), such as the sl-MaxTransPower IE, based on a priority level of the PSSCH transmission in a channel busy ratio (CBR) range that includes a CBR measured in a slot (e.g., a i-N slot). In some other examples (e.g., if the sl-MaxTransPower-r16 IE is not provided), then $P_{CMAX}$ may be equal to $P_{MAX,CBR}$. In some examples, $P_{PSSCH,D}(i)$ may be determined based on another IE, such as the IE dl-P0-PSSCH-PSCCH). For example, (e.g., if the IE dl-P0-PSSCH-PSCCH is provided), $P_{PSSCH,D}(i)$ may be determined according to the following equation:

$$P_{PSSCH,D}(i)=P_{O,D}+10 \log_{10}(2^{\mu} \cdot M_{RB}^{PSSCH}(i))+\alpha_D \cdot PL_D \text{ [dBm]} \quad (2)$$

In another example, (e.g., if the IE sl-P0-PSSCH-PSCCH is provided), $P_{PSSCH,D}(i)$ may be determined according to the following equation:

$$P_{PSSCH,D}(i)=\min(P_{CMAX},P_{MAX,CBR},P_{PSSCH,SL}(i)) \text{ [dBm]}. \quad (3)$$

In yet some other example, $P_{PSSCH,D}(i)$ may be determined according to the following equation:

$$P_{PSSCH,D}(i)=\min(P_{CMAX},P_{MAX,CBR}) \text{ [dBm]} \quad (4)$$

where $P_{O,D}$ may be defined according to a value of an IE, such as the dl-P0-PSSCH-PSCCH IE (e.g., if the dl-P0-PSSCH-PSCCH IE is provided). In some examples, $\alpha_D$ may be defined according to a value of an IE, such as the dl-Alpha-PSSCH-PSCCH IE (e.g., if the dl-Alpha-PSSCH-PSCCH IE is provided). In some other examples, $\alpha_D$ may be defined as a constant value (e.g., 1). In some examples, $PL_D$ may be predefined (e.g., as $PL_D$ $PL_{b,f,c}(q)$).

In some cases, the reference signal resource may be the reference signal resources used by the UE for determining a power of a physical uplink shared channel (PUSCH) transmission (e.g., a PUSCH transmission scheduled by a downlink control information (DCI) format 0_0 when the UE is configured to monitor a physical downlink control channel (PDCCH) for detection of a DCI format 0_0 transmission). Additionally, or alternatively, the reference signal resource may correspond to the synchronization signal (SS) or the physical broadcast channel (PBCH) block used by the UE to obtain a master information block (MIB), for example when the UE may not be configured to monitor the PDCCH for detection of DCI (e.g., DCI format 00). For example, $M_{RB}^{PSSCH}(i)$ may be the number of resource blocks for the (i) PSSCH transmission occasion and μ may be the subcarrier spacing (SCS) configuration. In some examples, if an IE (e.g., such as the sl-P0-PSSCH-PSCCH IE) is provided and if a sidelink control information (SCI) format scheduling the PSSCH transmission includes a cast type indicator field (e.g., indicating unicast), $P_{PSSCH,SL}(i)$ may be define according to the following equation:

$$P_{PSSCH,SL}(i)=P_{O,SL}+10 \log_{10}(2^{\mu} \cdot M_{RB}^{PSSCH}(i))+\alpha_{SL} \cdot PL_{SL} \text{ [dBm]}. \quad (5)$$

In some other examples, $P_{PSSCH,SL}(i)$ may be define according to the following equation:

$$P_{PSSCH,SL}(i)=\min(P_{CMAX},P_{PSSCH,D}(i)) \text{ [dBm]} \quad (6)$$

where $P_{O,SL}$ may be the value of an IE, such as the sl-P0-PSSCH-PSCCH IE (e.g., if the sl-P0-PSSCH-PSCCH IE is provided). In some examples, $\alpha_{SL}$ may be the value of an IE, such as the sl-Alpha-PSSCH-PSCCH IE (e.g., if the sl-Alpha-PSSCH-PSCCH IE is provided). In some other examples, $\alpha_{SL}$ may be defined as a constant value (e.g., 1). Additionally, or alternatively, $PL_{SL}$ may be defined according to the following equation:

$$PL_{SL}=\text{referenceSignalPower}-\text{higher layer filtered RSRP} \quad (7)$$

where referenceSignalPower may be obtained from a PSSCH transmit power per resource element summed over the antenna ports of the UE (e.g., the higher layer may be filtered across PSSCH transmission occasions using a filter configuration provided by an IE, such as the sl-filterCoefficient IE) and higher layer filtered RSRP may be a predefined RSRP that is reported to the UE from a UE receiving the PSCCH-PSSCH transmission. In some examples, higher layer filtered RSRP may be obtained from a PSSCH demodulation reference signal (DMRS) using a filter configuration provided by an IE, such as the sl-flterCoefficient IE. Additionally, or alternatively, $M_{RB}^{PSSCH}(i)$ may be the number of resource blocks for (i) PSCCH-PSSCH transmission occasions and μ may be the SCS configuration. For example, the UE may split the power (e.g., $P_{PSSCH,SL}(i)$) equally across the antenna ports from which the UE transmits PSSCH transmissions (e.g., with non-zero power).

In some examples, the UE may determine $P_{PSSCH2,b,c}(i)$ for a PSSCH transmission on a resource pool in the symbols where a corresponding PSCCH may be transmitted in (i) PSCCH-PSSCH transmission occasion according to the following equation:

$$P_{PSSCH2}(i) = 10\log_{10} \frac{\left(M_{RB}^{PSSCH}(i) - M_{RB}^{PSCCH}(i)\right)}{M_{RB}^{PSSCH}(i)} + P_{PSSCH}(i)[dBm] \quad (8)$$

where $M_{RB}^{PSCCH}(i)$ may be a number of resource blocks for the corresponding PSCCH transmission in the (i) PSCCH-PSSCH transmission occasion. In some examples, the UE may split the power ($P_{PSSCH2}(i)$) equally across the antenna ports from which the UE transmits the PSSCH (e.g., with non-zero power).

In some examples (e.g., to transmit over shared resources), the remote UEs (e.g., the UE 315-b and the UE 315-c) may each transmit an indication of the power headroom of the respective UE 315 to the primary UE (e.g., UE 315-a). The power headroom may be an example of the power headroom described with reference to FIG. 2. In some examples, the power headroom may be indicated via a medium access control-control element (MAC-CE) according to the following Table 1:

TABLE 1

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |

TABLE 1-continued

| PH | Power Headroom Level |
|---|---|
| 60 | POWER_HEADROOM_60 |
| 61 | POWER_HEADROOM_61 |
| 62 | POWER_HEADROOM_62 |
| 63 | POWER_HEADROOM_63 |

In some examples, the corresponding value may be defined according to the following Table 2:

TABLE 2

| Reported Value | Measured quantity value (dB) |
|---|---|
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| ... | ... |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

Thus, the UE 315-*a* may use power headroom information (e.g., or other power control information) indicated from the UE 315-*c* and the UE 315-*d* to determine one or more power adjustment parameters for adjustment of a transmit power at the UE 315-*b* or the UE 315-*c*, respectively. In some examples, the UE 315-*a* may transmit an indication of the one or more power adjustment parameters to the UE 315-*b* or the UE 315-*c* to manage the individual power levels at the UE 315-*b* and the UE 315-*c*, thereby reducing the likelihood of signal distortions during digital processing and improving resource efficiency.

Figure 4:
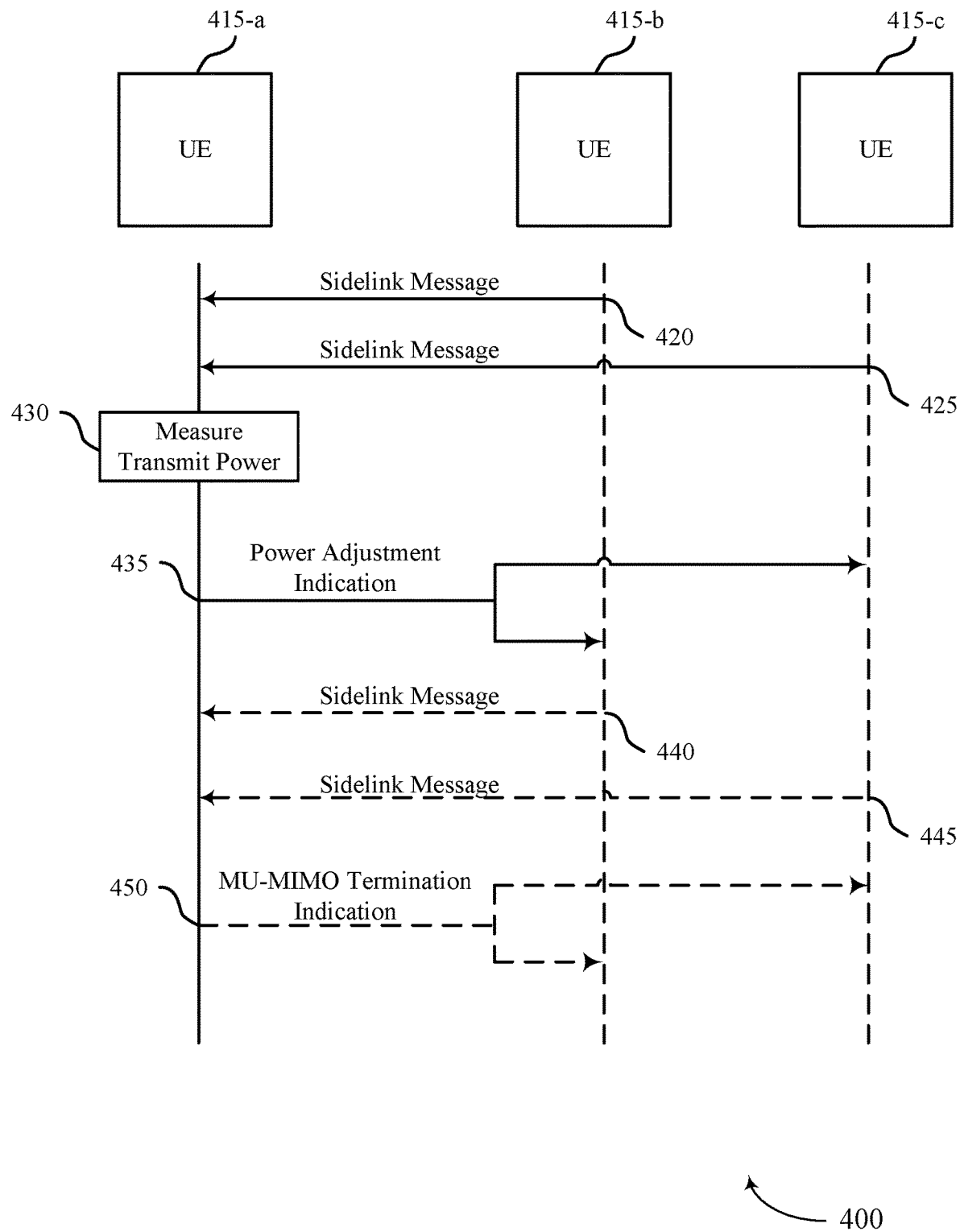
FIGS. 4 and 5 each illustrate an example of a process flow that supports power control techniques for sidelink communications in accordance with aspects of the present disclosure.

FIG. 4 illustrates an example of a process flow 400 that supports power control techniques for sidelink communications in accordance with aspects of the present disclosure. In some examples, the process flow 400 may implement aspects of the wireless communications systems 100, 200, and 300. For example, the process flow 400 may include a UE 415-*a*, a UE 415-*b*, and a UE 415-*c*, which may each be examples of a UE 115 described with reference to FIG. 1, a UE 215 described with reference to FIG. 2, and a UE 315 described with reference to FIG. 3. The process flow 400 may be implemented by one or more of the UEs 415. In the following description of the process flow 400, the information communicated between the UEs 415 may be performed in different orders or at different times. Some operations may also be omitted from the process flow 400, and other operations may be added to the process flow 400.

In some examples (e.g., to reduce or avoid signal distortions), one or more transmitting UEs (e.g., the UE 415-*b* or the UE 415-*c*) may perform a power adjustment such that the power of signals transmitted from the UE 415-*b* and the UE 415-*c* may be balanced at the receiving UE (e.g., the UE 415-*a*). For example, the UE 415-*b* and the UE 415-*c* may perform power level adjustments such that the received power (e.g., or the desired received power level, $P_0$) for the UE 415-*b* and the UE 415-*c* may be balanced at the UE 415-*a*. Stated alternatively the received power level from each link (e.g., the sidelink between the UE 415-*c* and the UE 415-*a* as well as the sidelink between the UE 415-*c* and the UE 415-*a*) or $P_0$(e.g., the desired power level) for each transmitting UE may be comparable or within (e.g., less than or equal to) some $\Delta X$ (dB) from each other (e.g., defined to one of the transmitting UEs), which may be referred to as a threshold. In some examples, the threshold $\Delta X$ may be configured at UE 415-*a* by a base station (e.g., via RRC signaling). Additionally, or alternatively, the threshold $\Delta X$ may be configured based on UE capabilities.

As an illustrative example, at 420 the UE 415-*b* may transmit a sidelink message to the UE 415-*a* and, at 425, the UE 415-*c* may transmit a sidelink message to the UE 415-*a*. The sidelink messages may be examples of sidelink messages described with reference to FIG. 2. At 430, the UE 415-*a* may determine one or more power adjustment parameters for adjustment of a transmit power at the UE 415-*b* or the UE 415-*c* (e.g., or both). For example, the UE 415-*a* (e.g., the receiving UE) may set the power level of the UE 415-*b* and the UE 415-*c*, such that signals transmitted from the UE 415-*b* and the UE 415-*c* have comparable received power at the UE 415-*a*.

In some cases, the UE 415-*a* may control the received power (e.g., and adjust an effective $P_0$ value) by adding $P_0$ to one or more power adjustment parameters (e.g., f or $\Delta f$). In some examples, power adjustment parameters as described herein may additionally or alternatively be referred to as power parameters, adjustment parameters, power control adjustment states, power control parameters, power values, or any combination thereof, among other examples. In some examples, the UE 415-*a* may add $P_0$ to f (e.g., or $\Delta f$) as follows:

$$P_{PSSCH,SL}(i) = P_{PSSCH,SL}(i) + f \quad (9)$$

where f may correspond to the power adjustment parameter (e.g., defined according to a predefined power control formula for a PUSCH transmission). Thus, the one or more power adjustment parameters indicated by the UE 415-*a* (e.g., via a sidelink) may be f (e.g., in the case of no accumulation) or $\Delta f$ (e.g., in the case of accumulation). For example, the UE 415-*a* may indicate f to the UE 415-*b* or the UE 415-*a* to achieve a different transmit power at the respective UE 415 (e.g., with no accumulation), or the UE 415-*a* may transmit $\Delta f$ to achieve a different transmit power at the respective UE 415 across multiple transmissions (e.g., with $\Delta f$ being accumulated over the multiple transmissions).

In some examples, f may be an example of the power adjustment parameter. For example, a transmitting UE 415-*b* may receive an indication of f and adjust a sidelink power (e.g., $P_{PSSCH,SL}(i)$) by a value indicated by f In some examples, the power adjustment parameter f may correspond to a change in a transmission power for the sidelink transmission relative to an initial or default sidelink transmission power (e.g., the power the UE 415-*b* indicated to the UE 415-*a* via power control information or a power corresponding to a measured power metric at the UE 415-*a*). In some other examples, $\Delta f$ may be an example of the power adjustment parameter That is, the UE 415-*a* may transmit control signaling indicating a change in the value off relative to a current value of f used at the transmitting UE 415. In some examples, using $\Delta f$ may result in reduced signaling overhead. Additionally or alternatively, using f may enable the UE 415-*b* to utilize a correct transmission power even if the UE 415-*b* misses or otherwise fails to receive one or more power adjustment indications.

The power adjustment parameters may be examples of power adjustment parameters described with reference to FIGS. 2 and 3. For example, the UE 415-*a* may determine one or more power adjustment parameters based on measuring the RSRP of the sidelink messages transmitted from the UE 415-*b* and the UE 415-*c* (e.g., at 420 and 425, respectively). Additionally, or alternatively, the UE 415-*a* may determine one or more power adjustment parameters based on power control information included in the sidelink messages transmitted from the UE 415-*b* and the UE 415-*c*. The power control information may be included in the sidelink messages transmitted at 420 and 425 (e.g., included in the sidelink messages that are measured and compared at step 430). Alternatively, the power control information may be received in other messages not illustrated in FIG. 4 (e.g., other sidelink messages received from UE 415-*a* and 415-*c* before 430). In some examples, the power control information may be an example of power control information described with reference to FIG. 2. For example, the power control information may include power headroom, maximum transmit power, or a current transmit power, among other examples.

At 435, the UE 415-*a* may transmit an indication of the one or more power adjustment parameters to the UE 415-*b* or the UE 415-*c* (e.g., or both). In some examples, the UE 415-*a* may use (e.g., transmit) a first parameter type (e.g., Δf) for first channel conditions and a second parameter type (e.g., f) for second channel conditions. In some examples, UE 415-*a* may signal the second parameter type if, for example, the chance of missing sidelink information (e.g., sidelink control information, sidelink feedback channel transmissions) over sidelink is relatively large. In some examples, a power adjustment parameter (e.g., f or Δf) may be determined, by the UE 415-*a*, and transmitted to the UE 415-*b* and/or the UE 415-*c*, such that a net change in power levels between the UE 415-*b* and the UE 415-*c* may satisfy a threshold (e.g., may be less than or equal to ΔX). In some examples, the UE 415-*a* may determine (e.g., based on the control information) that the difference in power levels between the UE 415-*b* and the UE 415-*c* may not be balanced. Additionally or alternatively, the UE 415-*a* may determine (e.g., based on the difference in power levels between the UE 415-*b* and the UE 415-*c*) that one UE (e.g., the UE 415-*b* or the UE 415-*c*) may not be capable of adjusting the power control at the respective UE 415 such that the power levels between the UE 415-*b* and the UE 415-*c* may be balanced. In such cases, the UE 415-*a* may transmit the power control parameter to the other UE 415 that is capable of adjusting the power control levels.

In some other examples, the UE 415-*b* or the UE 415-*c* may adjust the transmit power of the respective UE 415 autonomously. For example, the UE 415-*b* may measure the power levels of signals received from the UE 415-*b* and may adjust the transmit power of the UE 415-*b* accordingly (e.g., to be balanced with the UE 415-*c*). That is, when the UEs 415 are within a relatively close proximity to one another, the received power level of signals transmitted from the UE 415-*c* may be approximately the same at the UE 415-*b* and the UE 415-*a*. Therefore, the UE 415-*b* may measure the power level of signals transmitted from the UE 415-*c* via detecting (e.g., overhearing) signals over the PSSCH and measuring the RSRP (e.g., of the detected signals). In some examples, the detected signals may be DMRSs. In some cases, if the UE 415-*b* is the UE (e.g., node) that reserved the resources and indicated that the UE 415-*b* is enabled for MU-MIMO communications (e.g., if the UE 415-*b* initiated MU-MIMO communications) the UE 415-*b* may be referred to as the lead UE. In such cases, the UE 415-*c* may perform a power level adjustment (e.g., after measuring the RSRP of DMRSs transmitted from the UE 415-*b*) and the UE 415-*b* may transmit communications with a same (e.g., previous) power level. In some examples, the UE 415-*b* and the UE 415-*c* may then transmit one or more additional sidelink messages to the UE 415-*a* according to the power adjustment parameters. For example, at 440 the UE 415-*b* may transmit a sidelink message to the UE 415-*a* and, at 445, the UE 415-*c* may transmit a sidelink message to the UE 415-*a*. In some examples, the sidelink messages transmitted at 440 and 445 may be transmitted over shared resources and according to the power adjustment parameters transmitted at 435.

In some examples, a power control failure may occur and the UE 415-*a* may determine that balanced power levels are unachievable while maintaining communications of a threshold quality. In such examples, a MU-MIMO termination indication may be signaled to the UE 415-*b* and the UE 415-*c* from the UE 415-*a* (e.g., via a sidelink Mode 2 communication) or from a base station (e.g., via a sidelink Mode 1 communication). In some examples, an indication of the MU-MIMO termination may be transmitted on the physical sidelink feedback channel (PSFCH). For example, at 450 the UE 415-*a* may transmit a MU-MIMO termination indication (e.g., if the transmit power at the UE 415-*b* and the UE 415-*c* may not be balanced at the UE 415-*a*). In some examples, the MU-MIMO termination indication may be an example of a MU-MIMO termination indication described with reference to FIG. 3. For example, the MU-MIMO termination indication may be transmitted in response to the UE 415-*a* determining that a power control failure occurred.

In some examples, the MU-MIMO termination indication may be transmitted through a bitmap (e.g., a 2-bit bitmap in case of two transmitting UEs) to indicate to each transmitting UE (e.g., the UE 415-*b* and the UE 415-*c*) whether or not to transmit on the reserved (e.g., shared) resources. In some cases, the UE which initiated the MU-MIMO communications (e.g., the UE 415-*b*) may transmit on the resources reserved for the shared communications (e.g., the reserved resources) and the MU-MIMO communications may be terminated for the UE 415-*c*. Stated alternatively, the transmitting UE that reserved the resources (e.g., the lead UE) the may own the resources and the MU-MIMO termination indication may be for the other UEs which joined the MU-MIMO period. In some examples, once the MU-MIMO communications are terminated, the lead UE (the UE 415-*b*) may use full power (e.g., or a relatively higher power) to transmit communications via the shared resources. In some examples, a UE (e.g., the UE 415-*b*) may have two sets of open-loop power control parameters. In another example, a UE may have two sets of closed-loop power control parameters, such that the UE 415-*b* may use one set of closed-loop power control parameters for MU-MIMO communications and the other set of closed-loop power control parameters for SU-MIMO communications.

In some examples, the transmitting UEs (e.g., the UE 415-*b* and the UE 415-*c*) may share the power headroom of the respective UE 415 (e.g., and other power control information) with the receiving UE (e.g., the UE 415-*a*), such that the UE 415-*a* may determine whether MU-MIMO may or may not be applicable. For example, the UE 415-*a* may determine whether the individual power of the superimposed signals (e.g., the quantized power level of signals transmitted from the UE 415-*b* and the UE 415-*c*) are comparable, for example within a threshold (e.g., ΔX). In some cases, the quantized power level of signals transmitted from the UE 415-*b* may not be comparable to the quantized power level of signals transmitted from the UE 415-*c* (e.g., may not satisfy a threshold). In such cases, MU-MIMO communications may be disabled by the receiving UE (e.g., the UE 415-*a*) or a transmitting UE (e.g., the UE 415-*b* or the UE 415-*c*).

In some examples, the UE 415-*b* or the UE 415-*c* may report power control information (e.g., power headroom, maximum transmit power, a current transmit power, and the like) to the UE 415-*a*. For example, the UE 415-*b* or the UE 415-*c* may report $P_{PSSCH,D}$ to the UE 415-*a*. In some cases, the $P_{PSSCH,D}$ may be referred to as a power metric (e.g., a physical sidelink shared channel power for downlink communications). In some cases, $P_{PSSCH,D}$ may be determined by the respective UE 415 based on a predefined downlink pathloss (e.g., if the downlink pathloss is configured for power control). Additionally, or alternatively, the UE 415-*b* or the UE 415-*c* may report $P_{MAX,CBR}$ (e.g., which may be defined according to a predefined formula) and L, which may be defined according to the following equation:

$$L=\min(P_{CMAX}, P_{PSSCH,D}, P_{PSSCH,SL}, P_{MAX,CBR}). \quad (10)$$

In some examples, $P_{MAX,CBR}$ may be referred to as a maximum transmit power parameter (e.g., a maximum transmission output, for example, for CBR) and L may be referred to as a minimum power metric as reflected herein.

Additionally, or alternatively, the UE 415-*b* or the UE 415-*c* may report the power headroom, which may be the value of L minus the value of used power at the respective UE 415. For uplink communications, one or more UEs 415 may report both power headroom and $P_{CMAX}$ per cell. However, for sidelink communications, the UE 415 may experience uplink interference due to CBR and, as such, may be unable to use a threshold (e.g., maximum) power. Therefore, in some cases, the power headroom may be computed by taking the difference between the threshold (e.g., maximum) transmit power (e.g., $\min(P_{CMAX}, P_{PSSCH,D}, P_{MAX,CBR})$) and the transmit power as determined by the following equation:

$$P_{PSSCH,SL}(i) = P_{O,SL} + 10 \log_{10}(2^{\mu} \cdot M_{RB}^{PSSCH}(i)) + \alpha_{SL} \cdot PL_{SL} \text{ [dBm]}. \quad (11)$$

In some examples, the power reports (e.g., for the sidelink communications) may be triggered by a change in path loss or periodically. For example, a power report may be signaled (e.g., transmitted from the UE 415-*b* or the UE 415-*c*) in a dedicated PSSCH resource, such as a sidelink MAC-CE or in a SCI (e.g., a SCI-2) of a previous transmission.

In some examples, transmissions from the UE 415-*b* and the UE 415-*c* may overlap in one or more resources (e.g., time-frequency resources) and, as a result, MU-MIMO communications may be created. However, in some examples, one of the UE 415-*b* or the UE 415-*c* may have transmitted one or more communications to the UE 415-*a* first. Stated alternatively, the UE 415-*b* may have initiated MU-MIMO communications. For example, the UE 415-*b* may have transmitted a communication to the UE 415-*a* prior to the UE 415-*c* transmitting a communication to the 415-*a*. In such an example, the UE which did not start transmitting communications first (e.g., the UE 415-*c*) may perform a power level adjustment based on feedback from the UE 415-*a*. For example, the UE 415-*a* may transmit a power control command (e.g., an indication of one or more power adjustment parameters) to adjust $P_O$ (e.g., or the received power at the UE 415-*a*) to the UE 415-*c*. In some examples, the UE 415-*b* may transmit the indication via a PSFCH resource or a dedicated PSSCH resource. In some cases, the UE 415-*a* may transmit the indication based on measured RSRP of DMRSs transmitted from the UE 415-*b* and the UE 415-*c*.

Figure 5:
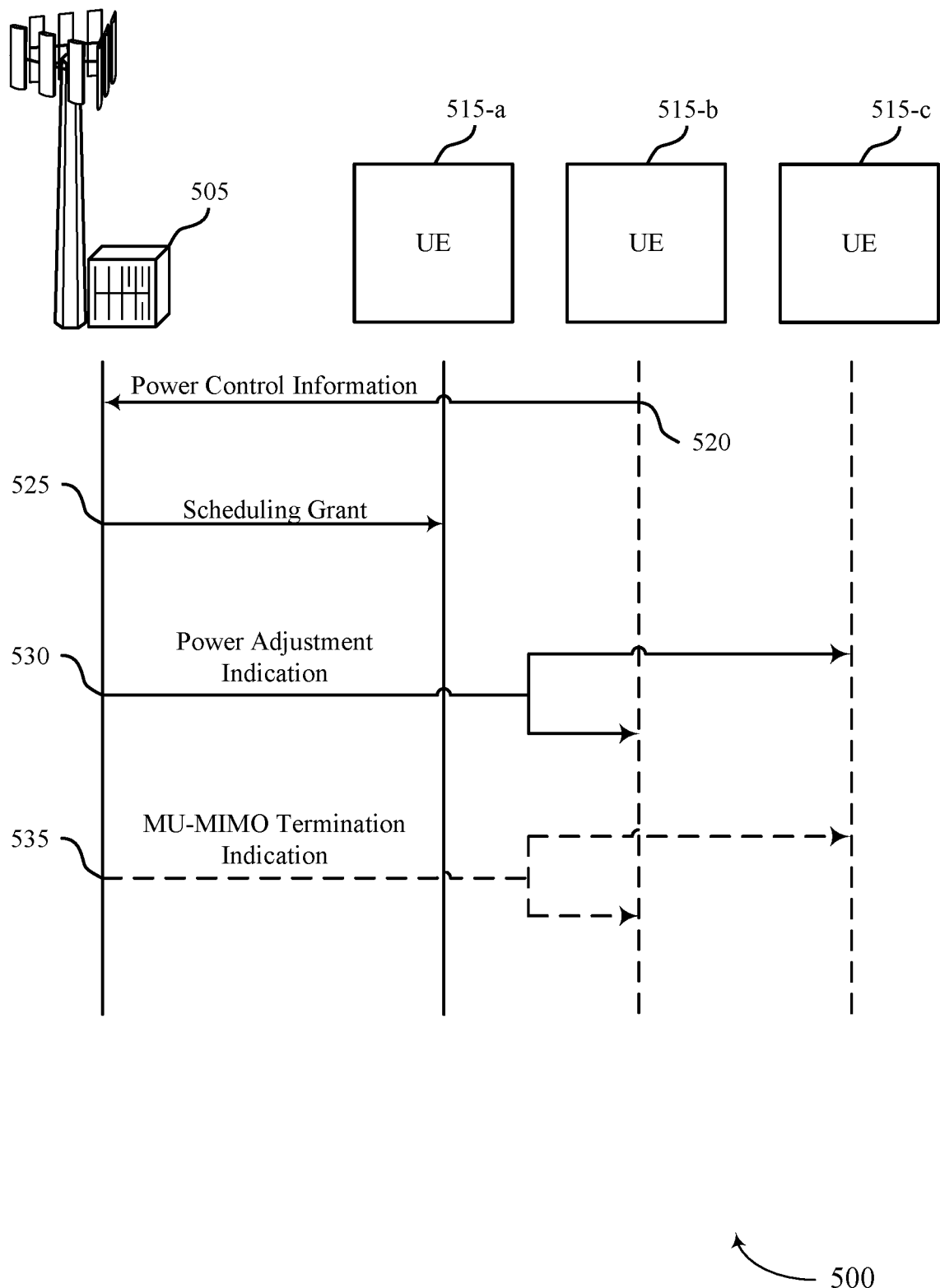

FIG. 5 illustrates an example of a process flow 500 that supports power control techniques for sidelink communications in accordance with aspects of the present disclosure. In some examples, the process flow 500 may implement aspects of the wireless communications systems 100, 200, and 300. For example, the process flow 500 may include a base station 505, and one or more UEs 515 (e.g., a UE 515-*a*, a UE 515-*b*, and a UE 515-*c*), which may each be examples of the corresponding devices described with reference to FIGS. 1, 2, and 3. The process flow 500 may be implemented by the base station 505, one or more of the UEs 515, or a combination thereof. In the following description of the process flow 500, the information communicated between the base station 505 and UEs 515 may be performed in different orders or at different times. Some operations may also be omitted from the process flow 500, and other operations may be added to the process flow 500.

In some examples, the base station 505 may manage the individual power levels at the UE 515-*b* and the UE 515-*c*, such that the received power level of signals transmitted from the UE 515-*b* and the UE 515-*c* may be balanced at the UE 515-*a*. For example, the base station 505 may manage the power control of the UE 515-*b* and the UE 515-*c* in a sidelink Mode-1 manner. In some examples, the base station 505 may manage the power control of the UE 515-*b* and the UE 515-*c* via power headroom commands sent (e.g., transmitted via a Uu link) from the base station 505 to one or more of the UEs 515 (e.g., the UE 515-*b* or the UE 515-*c*). In some examples (e.g., during sidelink Mode 1 operations), the base station 505 may transmit a power control command (e.g., an indication of one or more power adjustment parameters) based on power control information (e.g., power headroom, maximum transmit power, a current transmit power, and the like) transmitted from one or more of the UEs 515.

In some examples, the base station 505 may obtain information regarding which UE 515 may be receiving the sidelink communications (e.g., which UE 515 may be the receiver). Additionally, or alternatively, the base station 505 may obtain information regarding the characteristics of the channel between the UE 515-*b* and the UE 515-*a* as well as the channel between the UE 515-*c* and the UE 515-*a*. In some examples, one or more of the UEs 515 may report channel state information (CSI) of the link (e.g., the sidelink) between the UE 515-*a* and the UE 515-*b* as well as the CSI of the sidelink between the UE 515-*a* and the UE 515-*c*.

For example, at 520 the UE 515-*b* may transmit power control information (e.g., power headroom, CSI, or RSRP measurements) to the base station 505. In some examples, the power control information may be an example of the power control information as described with reference to FIG. 2. For example, the power control information may be transmitted to the base station 505 via a Uu link (e.g., an uplink).

In such examples, one or more of the UEs 515 may also report RSRP measurements (e.g., of DMRSs) to the base station 505. For example, when the base station 505 assigns resources to the UEs 515 (e.g., via DCI), the base station 505 may indicate a threshold (e.g., maximum) power or $P_O$ (e.g., a desired transmit power) for one or more of the UEs 515. Stated alternatively, the base station 505 may tell UEs what their maximum power should be or it can assign exact transmit power levels (e.g., dynamically in DCI). For example, at 525, the base station 505 may transmit a scheduling grant to schedule one or more sidelink transmissions from the UE 515-*b* to the UE 515-*a* and the from the UE 515-*c* to the UE 515-*a* over shared resources. The scheduling grant may be an example of scheduling described with reference to FIG. 2. For example, the scheduling grant may be transmitted from the base station 505 via a downlink.

At 530, the base station 505 may transmit a power adjustment indication indicating one or more power adjustment parameters to the UE 515-*b* and the UE 515-*c*. The one or more power adjustment parameters may be example of power adjustment parameters described with reference to FIG. 2. For example, the one or more power adjustment parameters may be associated with sidelink communications between the UE 515-*b* and the UE 515-*a* or between the UE 515-*c* and the UE 515-*a*.

Additionally, or alternatively, the base station 505 may indicate the termination (e.g., cancellation) of MU-MIMO communications, for example via a DCI. In some examples, the base station 505 may indicate the termination of MU-MIMO communications if $P_0$ may not be maintained at one or more UEs 515 or a comparable received power across the two links (the link between UE 515-*b* and the UE 515-*a* as well as the link between the UE 515-*c* and the UE 515-*a*) may not be obtained. Stated alternatively, the base station 505 may transmit a MU-MIMO termination indication if the power level of signals transmitted from the UE 515-*b* may not be adjusted to a power level that is comparable with the power level of signals transmitted from the UE 515-*c*.

For example, at 530 the base station 505 may transmit a power adjustment indication indicating one or more power adjustment parameters to the UE 515-*b* and the UE 515-*c*. The one or more power adjustment parameters may be example of power adjustment parameters described with reference to FIG. 2. For example, the one or more power adjustment parameters may be associated with sidelink communications between the UE 515-*b* and the UE 515-*a* or between the UE 515-*c* and the UE 515-*a*. At 535, the base station 505 may transmit a MU-MIMO termination indication terminating MU-MIMO communications for the UE 515-*b* and the UE 515-*c*. In some examples, the MU-MIMO termination indication may be an example of the MU-MIMO termination indication described with reference to FIGS. 3 and 4. For example, the MU-MIMO termination indication may be transmitted in response to the base station 505 determining that signals transmitted from the UE 515-*b* and the UE 515-*c* may not be balanced at the UE 515-*a* (e.g., due to a lack of power headroom at either the UE 515-*b* or the UE 515-*c*).

Figure 6:
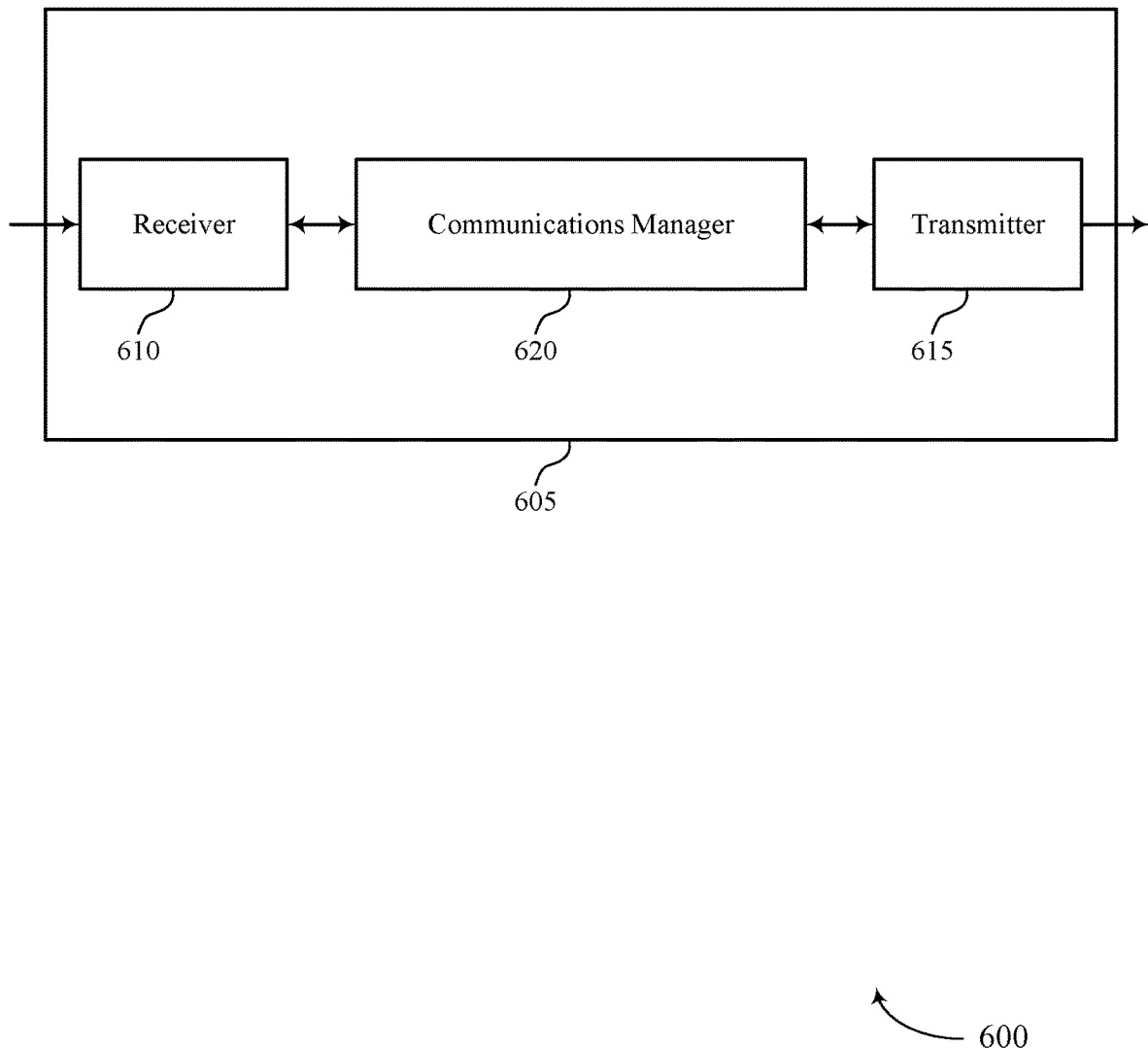
FIGS. 6 and 7 show block diagrams of devices that support power control techniques for sidelink communications in accordance with aspects of the present disclosure.

FIG. 6 shows a block diagram 600 of a device 605 that supports power control techniques for sidelink communications in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to power control techniques for sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power control techniques for sidelink communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of power control techniques for sidelink communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first UE (e.g., the device 605) in accordance with examples as disclosed herein. For example, the communications manager 620 may be configured as or otherwise support a means for measuring a first power level of a first sidelink message received from a second UE (e.g., a UE 115). The communications manager 620 may be configured as or otherwise support a means for measuring a second power level of a second sidelink message from a third UE (e.g., another UE 115). The communications manager 620 may be configured as or otherwise support a means for transmitting, to at least one of the second UE or the third UE, an indication of one or more power adjustment parameters for adjustment of a transmit power, the indication being based on the first power level and the second power level.

Additionally, or alternatively, the communications manager 620 may support wireless communications at a second UE (e.g., another device 605) in accordance with examples as disclosed herein. For example, the communications manager 620 may be configured as or otherwise support a means for transmitting a first sidelink message via a sidelink to a first UE (e.g., a UE 115). The communications manager 620 may be configured as or otherwise support a means for receiving an indication of a power adjustment parameter for adjustment of a transmit power at the second UE based on the first sidelink message. The communications manager 620 may be configured as or otherwise support a means for transmitting, to the first UE, a second sidelink message in accordance with the power adjustment parameter, the second sidelink message communicated on a same sidelink channel resource as a third sidelink message from a third UE (e.g., another UE 115).

By including or configuring the communications manager 620 in accordance with examples as described herein, the device 605 (e.g., a processor controlling or otherwise coupled with the receiver 610, the transmitter 615, the communications manager 620, or a combination thereof) may support power control techniques for sidelink communications. For example, the device 605 may manage the power control at one or more UEs 115, which may result in reduced processing and more efficient utilization of communication resources.

Figure 7:
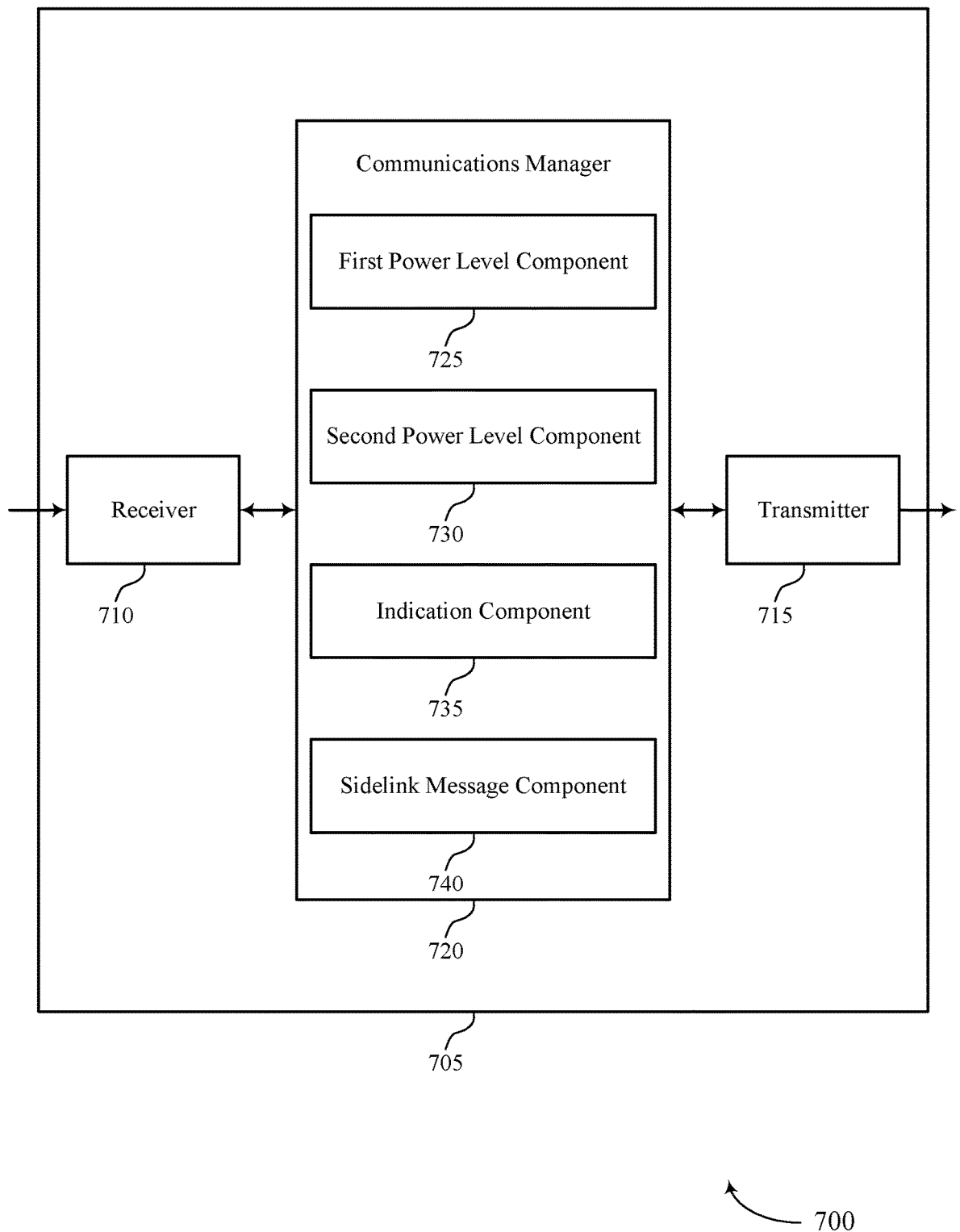

FIG. 7 shows a block diagram 700 of a device 705 that supports power control techniques for sidelink communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to power control techniques for sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to power control techniques for sidelink communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of power control techniques for sidelink communications as described herein. For example, the communications manager 720 may include a first power level component 725, a second power level component 730, an indication component 735, a sidelink message component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE (the device 705) in accordance with examples as disclosed herein. The first power level component 725 may be configured as or otherwise support a means for measuring a first power level of a first sidelink message received from a second UE (e.g., a UE 115). The second power level component 730 may be configured as or otherwise support a means for measuring a second power level of a second sidelink message from a third UE (e.g., another UE 115). The indication component 735 may be configured as or otherwise support a means for transmitting, to at least one of the second UE or the third UE, an indication of one or more power adjustment parameters for adjustment of a transmit power, the indication being based on the first power level and the second power level.

Additionally, or alternatively, the communications manager 720 may support wireless communications at a second UE (e.g., another device 705) in accordance with examples as disclosed herein. The sidelink message component 740 may be configured as or otherwise support a means for transmitting a first sidelink message via a sidelink to a first UE (e.g., a UE 115). The indication component 735 may be configured as or otherwise support a means for receiving an indication of a power adjustment parameter for adjustment of a transmit power at the second UE based on the first sidelink message. The sidelink message component 740 may be configured as or otherwise support a means for transmitting, to the first UE, a second sidelink message in accordance with the power adjustment parameter, the second sidelink message communicated on a same sidelink channel resource as a third sidelink message from a third UE (e.g., another UE 115).

Figure 8:
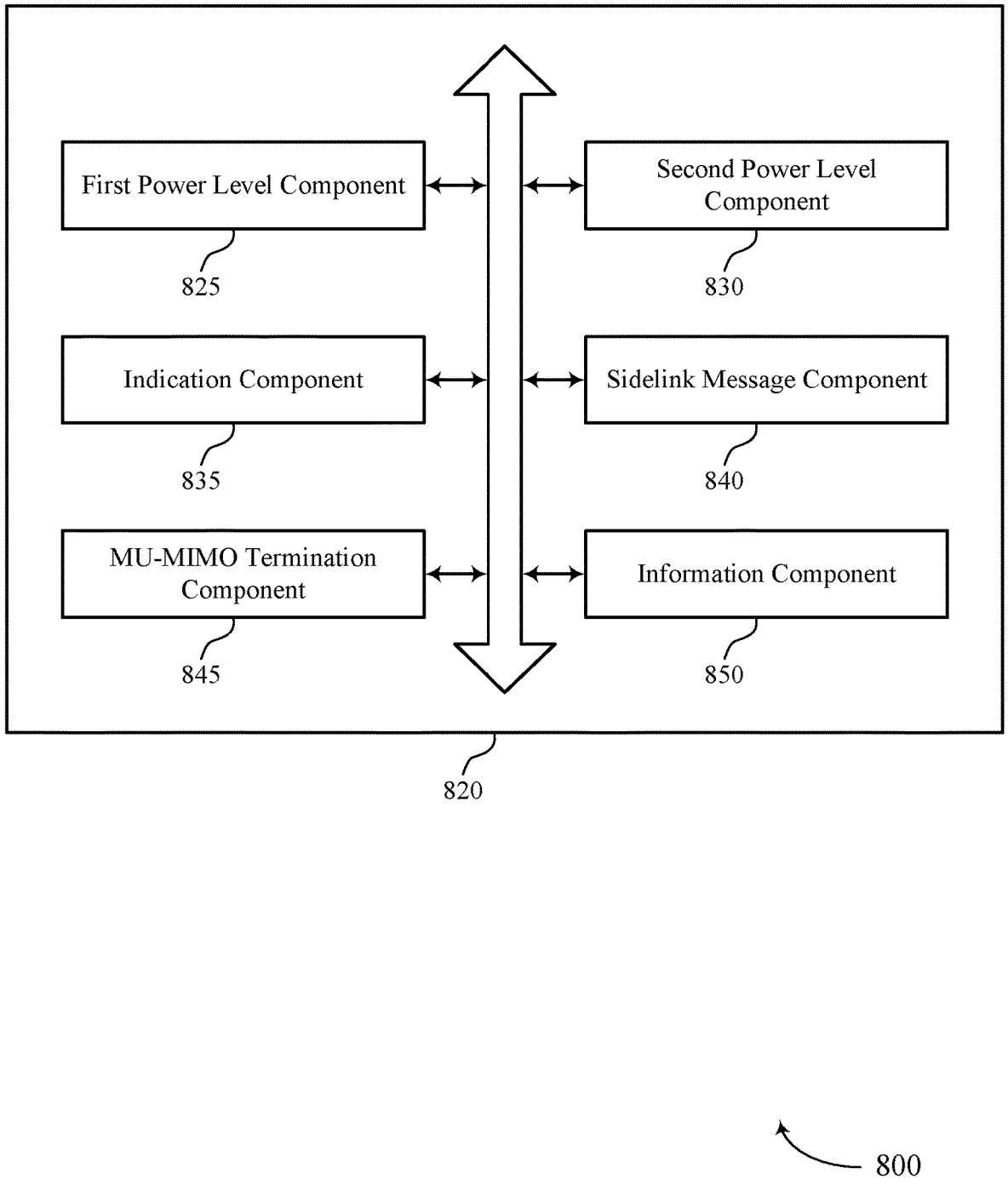
FIG. 8 shows a block diagram of a communications manager that supports power control techniques for sidelink communications in accordance with aspects of the present disclosure.

FIG. 8 shows a block diagram 800 of a communications manager 820 that supports power control techniques for sidelink communications in accordance with aspects of the present disclosure. The communications manager 820 may be an example of aspects of a communications manager 620, a communications manager 720, or both, as described herein. The communications manager 820, or various components thereof, may be an example of means for performing various aspects of power control techniques for sidelink communications as described herein. For example, the communications manager 820 may include a first power level component 825, a second power level component 830, an indication component 835, a sidelink message component 840, a MU-MIMO termination component 845, an information component 850, or any combination thereof. Each of these components may communicate, directly or indirectly, with one another (e.g., via one or more buses).

The communications manager 820 may support wireless communications at a first UE (e.g., a UE 115) in accordance with examples as disclosed herein. The first power level component 825 may be configured as or otherwise support a means for measuring a first power level of a first sidelink message received from a second UE (e.g., another UE 115). The second power level component 830 may be configured as or otherwise support a means for measuring a second power level of a second sidelink message from a third UE (e.g., another UE 115). The indication component 835 may be configured as or otherwise support a means for transmitting, to at least one of the second UE or the third UE, an indication of one or more power adjustment parameters for adjustment of a transmit power, the indication being based on the first power level and the second power level.

In some examples, the indication component 835 may be based on a difference between the first power level and the second power level failing to satisfy a threshold.

In some examples, to support transmitting the indication, the indication component 835 may be configured as or otherwise support a means for transmitting an indication of a first power adjustment parameter for the adjustment of the transmit power relative to an initial transmit power, or relative to a second power adjustment parameter, or a combination thereof. In some examples, the MU-MIMO termination component 845 may be configured as or otherwise support a means for communicating an indication to terminate MU-MIMO communications based on a power control failure.

In some examples, to support communicating the indication to terminate the MU-MIMO communications, the MU-MIMO termination component 845 may be configured as or otherwise support a means for transmitting the indication to terminate the MU-MIMO communications to the second UE, the third UE, or both. In some examples, to support communicating the indication to terminate the MU-MIMO communications, the MU-MIMO termination component 845 may be configured as or otherwise support a means for receiving the indication to terminate the MU-MIMO communications from a base station. In some examples, the indication to terminate the MU-MIMO communications includes a bit corresponding to a respective UE indicating to transmit on a same sidelink channel resource or to refrain from transmitting on the same sidelink channel resource.

In some examples, the information component 850 may be configured as or otherwise support a means for receiving the first sidelink message indicating first power control information, the first power control information including a first power headroom of the second UE, a sidelink transmit power of the second UE, a maximum sidelink transmit power of the second UE, or any combination thereof. In some examples, the information component 850 may be configured as or otherwise support a means for receiving the second sidelink message indicating second power control information, the second power control information including a second power headroom of the third UE, a sidelink transmit power of the third UE, a maximum sidelink transmit power of the third UE, or any combination thereof, where transmitting the indication of the one or more power adjustment parameters is based at least in part on the first power control information and the second power control information.

In some examples, the sidelink message component 840 may be configured as or otherwise support a means for receiving the first sidelink message and the second sidelink message via dedicated sidelink shared channel resources, sidelink MAC-CEs, SCI, or any combination thereof. In some examples, to support transmitting the indication, the indication component 835 may be configured as or otherwise support a means for transmitting, to the third UE, the indication based on the second UE initiating a third sidelink message before an initiation of a fourth sidelink message from the third UE. In some examples, to support transmitting the indication, the indication component 835 may be configured as or otherwise support a means for transmitting the indication via dedicated sidelink shared channel resources, sidelink feedback channel resources, or any combination thereof.

Additionally, or alternatively, the communications manager 820 may support wireless communications at a second UE in accordance with examples as disclosed herein. The sidelink message component 840 may be configured as or otherwise support a means for transmitting a first sidelink message via a sidelink to a first UE. In some examples, the indication component 835 may be configured as or otherwise support a means for receiving an indication of a power adjustment parameter for adjustment of a transmit power at the second UE based on the first sidelink message. In some examples, the sidelink message component 840 may be configured as or otherwise support a means for transmitting, to the first UE, a second sidelink message in accordance with the power adjustment parameter, the second sidelink message communicated on a same sidelink channel resource as a third sidelink message from a third UE.

In some examples, to support transmitting the second sidelink message, the sidelink message component 840 may be configured as or otherwise support a means for transmitting the second sidelink message associated with a first power level, where a difference between the first power level and a second power level associated with the third sidelink message satisfies a threshold based on receiving the indication. In some examples, to support receiving the indication, the indication component 835 may be configured as or otherwise support a means for receiving an indication of a first power adjustment parameter for the adjustment of the transmit power relative to an initial transmit power or relative to a second power adjustment parameter or a combination thereof.

In some examples, the MU-MIMO termination component 845 may be configured as or otherwise support a means for receiving, from the first UE or a base station, an indication to terminate MU-MIMO communications based on a power control failure. In some examples, the indication to terminate the MU-MIMO communications includes a bit corresponding to a respective UE indicating to transmit on the same sidelink channel resource or to refrain from transmitting on the same sidelink channel resource.

In some examples, to support transmitting the first sidelink message, the sidelink message component 840 may be configured as or otherwise support a means for transmitting the first sidelink message indicating power control information, the power control information including a power headroom of the second UE, a sidelink transmit power of the second UE, a maximum sidelink transmit power of the second UE, or any combination thereof. In some examples, to support transmitting the first sidelink message, the sidelink message component 840 may be configured as or otherwise support a means for transmitting the first sidelink message via dedicated sidelink shared channel resources, sidelink MAC-CEs, SCI, or any combination thereof.

In some examples, to support receiving the indication, the indication component 835 may be configured as or otherwise support a means for receiving, from the first UE, the indication based on the third UE initiating the third sidelink message before an initiation of the second sidelink message. In some examples, to support receiving the indication, the indication component 835 may be configured as or otherwise support a means for receiving the indication via dedicated sidelink shared channel resources, sidelink feedback channel resources, or any combination thereof.

Figure 9:
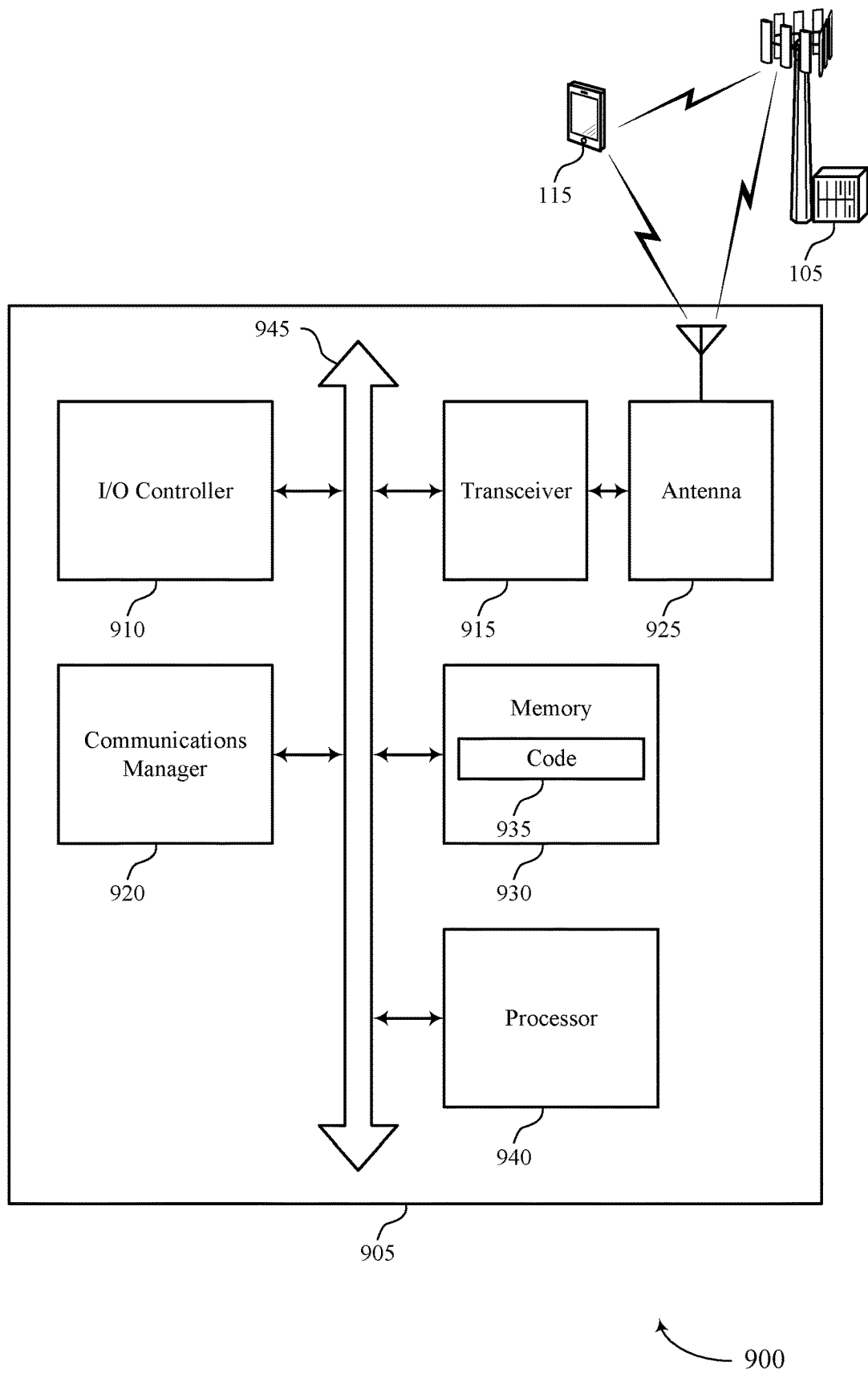
FIG. 9 shows a diagram of a system including a device that supports power control techniques for sidelink communications in accordance with aspects of the present disclosure.

FIG. 9 shows a diagram of a system 900 including a device 905 that supports power control techniques for sidelink communications in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting power control techniques for sidelink communications). For example, the device 905 or a component of the device 905 may include a processor 940 and memory 930 coupled with the processor 940, the processor 940 and memory 930 configured to perform various functions described herein.

The communications manager 920 may support wireless communications at a first UE (e.g., the device 905) in accordance with examples as disclosed herein. For example, the communications manager 920 may be configured as or otherwise support a means for measuring a first power level of a first sidelink message received from a second UE (e.g., a UE 115). The communications manager 920 may be configured as or otherwise support a means for measuring a second power level of a second sidelink message from a third UE (e.g., another UE 115). The communications manager 920 may be configured as or otherwise support a means for transmitting, to at least one of the second UE or the third UE, an indication of one or more power adjustment parameters for adjustment of a transmit power, the indication being based on the first power level and the second power level.

Additionally, or alternatively, the communications manager 920 may support wireless communications at a second UE (e.g., another device 905) in accordance with examples as disclosed herein. For example, the communications manager 920 may be configured as or otherwise support a means for transmitting a first sidelink message via a sidelink to a first UE (e.g., a UE 115). The communications manager 920 may be configured as or otherwise support a means for receiving an indication of a power adjustment parameter for adjustment of a transmit power at the second UE based on the first sidelink message. The communications manager 920 may be configured as or otherwise support a means for transmitting, to the first UE, a second sidelink message in accordance with the power adjustment parameter, the second sidelink message communicated on a same sidelink channel resource as a third sidelink message from a third UE (e.g., another UE 115).

By including or configuring the communications manager 920 in accordance with examples as described herein, the device 905 may support power control techniques for sidelink communications. For example, the device 905 may manage the power control at one or more UEs 115, which may result in improved communication reliability, reduced latency, improved user experience related to reduced processing, more efficient utilization of communication resources, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of power control techniques for sidelink communications as described herein, or the processor 940 and the memory 930 may be otherwise configured to perform or support such operations.

Figure 10:
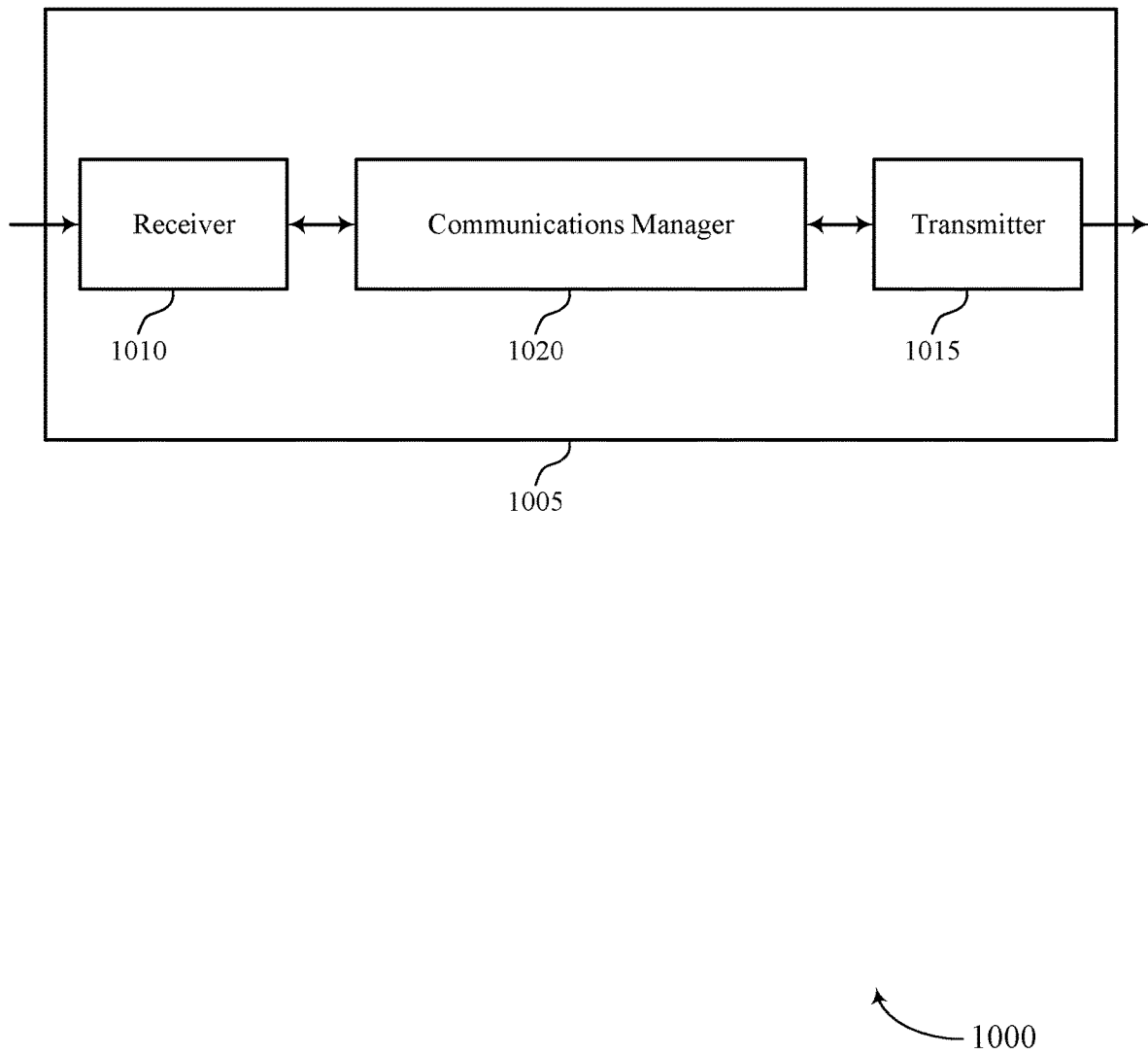
FIGS. 10 and 11 show block diagrams of devices that support power control techniques for sidelink communications in accordance with aspects of the present disclosure.

FIG. 10 shows a block diagram 1000 of a device 1005 that supports power control techniques for sidelink communications in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to power control techniques for sidelink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to power control techniques for sidelink communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of power control techniques for sidelink communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station (e.g., the device 1005) in accordance with examples as disclosed herein. For example, the communications manager 1020 may be configured as or otherwise support a means for receiving power control information associated with a set of sidelinks for communications between a set of UEs (e.g., a set of UEs 115), the set of UEs including at least a second UE and a third UE. The communications manager 1020 may be configured as or otherwise support a means for transmitting a grant scheduling transmission of a first sidelink message from the second UE to a first UE and a second sidelink message from the third UE to the first UE on a same sidelink channel resource. The communications manager 1020 may be configured as or otherwise support a means for transmitting, to the second UE, the third UE, or both, at least one indication of one or more power adjustment parameters for adjustment of a transmit power for the first sidelink message, the second sidelink message, or both, based on receiving the power control information.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support power control techniques for sidelink communications. For example, the device 1005 may manage the power control at one or more UEs 115, which may result in reduced processing and more efficient utilization of communication resources.

Figure 11:
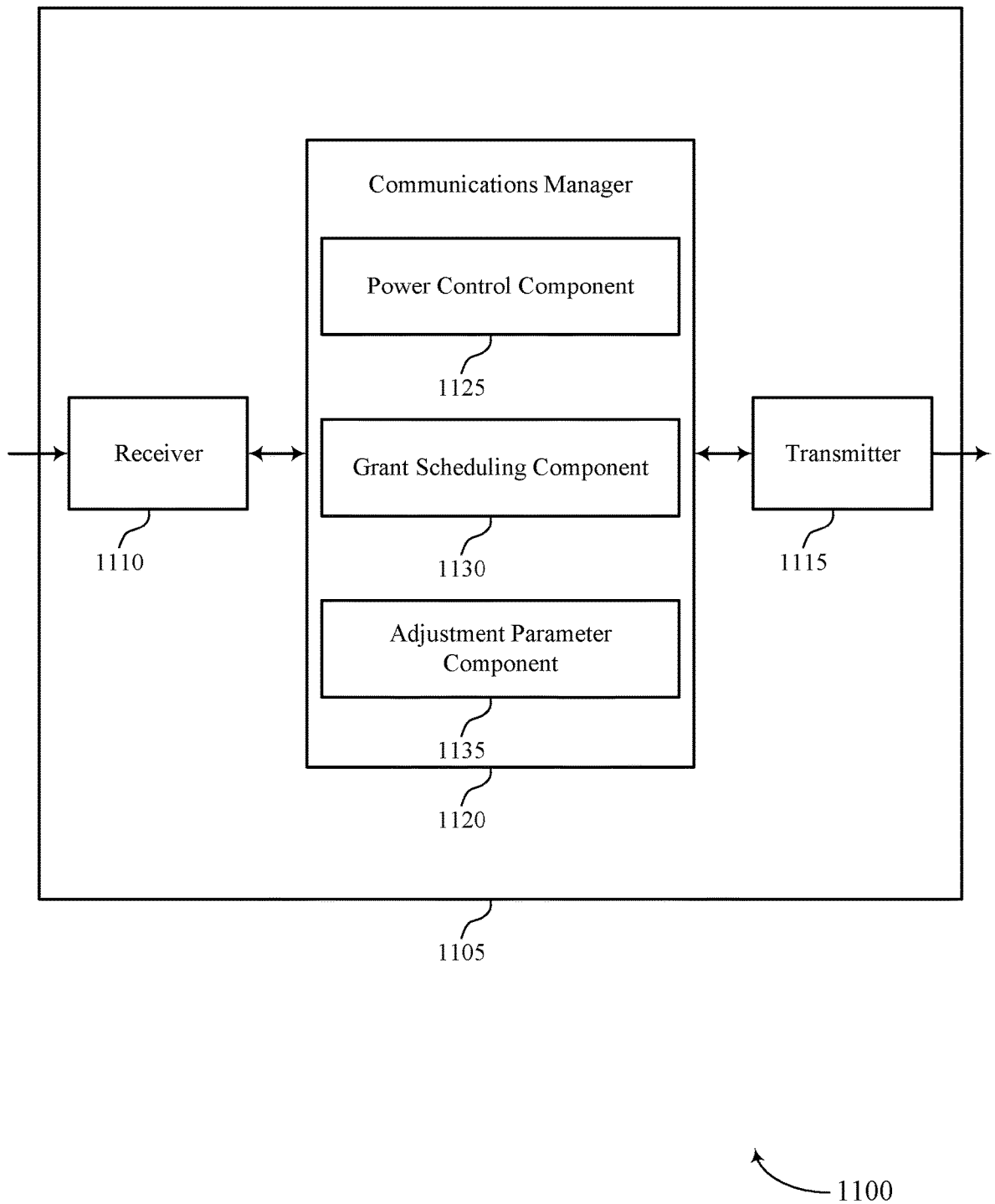

FIG. 11 shows a block diagram 1100 of a device 1105 that supports power control techniques for sidelink communications in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to power control techniques for sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to power control techniques for sidelink communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of power control techniques for sidelink communications as described herein. For example, the communications manager 1120 may include a power control component 1125, a grant scheduling component 1130, an adjustment parameter component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station (e.g., the device 1105) in accordance with examples as disclosed herein. The power control component 1125 may be configured as or otherwise support a means for receiving power control information associated with a set of sidelinks for communications between a set of UEs (e.g., a set of UEs 115), the set of UEs including at least a second UE and a third UE. The grant scheduling component 1130 may be configured as or otherwise support a means for transmitting a grant scheduling transmission of a first sidelink message from the second UE to a first UE and a second sidelink message from the third UE to the first UE on a same sidelink channel resource. The adjustment parameter component 1135 may be configured as or otherwise support a means for transmitting, to the second UE, the third UE, or both, at least one indication of one or more power adjustment parameters for adjustment of a transmit power for the first sidelink message, the second sidelink message, or both, based on receiving the power control information.

Figure 12:
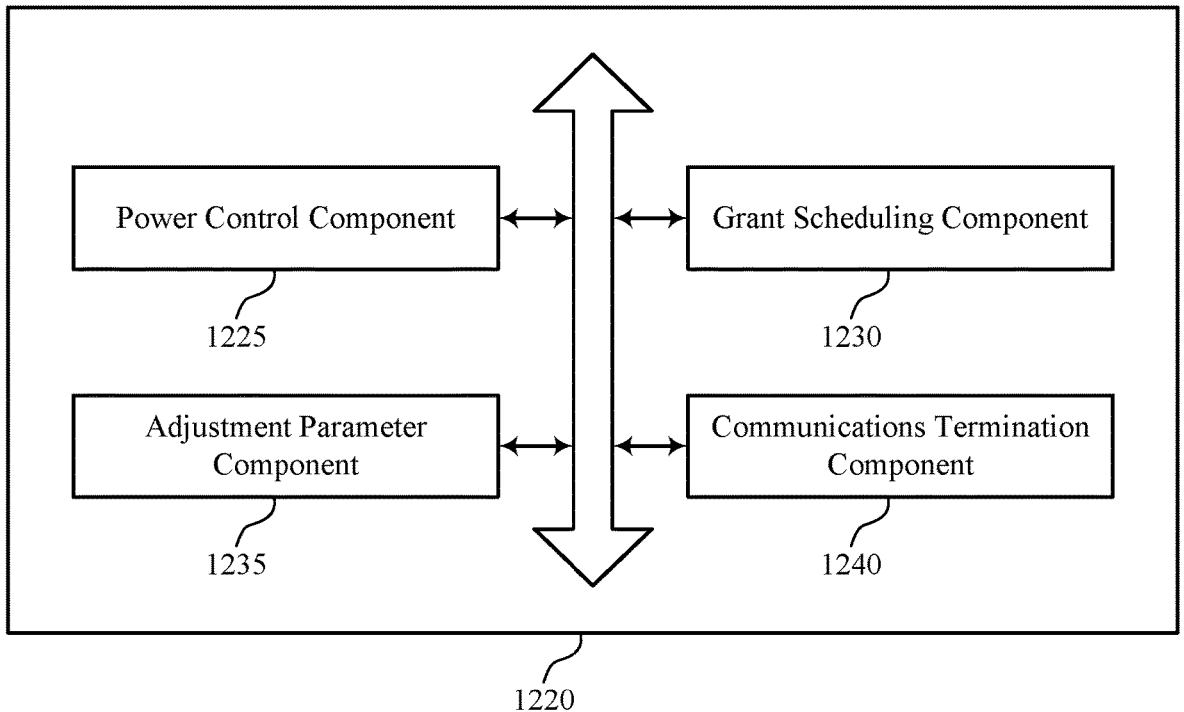
FIG. 12 shows a block diagram of a communications manager that supports power control techniques for sidelink communications in accordance with aspects of the present disclosure.

FIG. 12 shows a block diagram 1200 of a communications manager 1220 that supports power control techniques for sidelink communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of power control techniques for sidelink communications as described herein. For example, the communications manager 1220 may include a power control component 1225, a grant scheduling component 1230, an adjustment parameter component 1235, a communications termination component 1240, or any combination thereof. Each of these components may communicate, directly or indirectly, with one another (e.g., via one or more buses).

The communications manager 1220 may support wireless communications at a base station (e.g., a base station 105) in accordance with examples as disclosed herein. The power control component 1225 may be configured as or otherwise support a means for receiving power control information associated with a set of sidelinks for communications between a set of UEs (e.g., a set of UEs 115), the set of UEs including at least a second UE and a third UE. The grant scheduling component 1230 may be configured as or otherwise support a means for transmitting a grant scheduling transmission of a first sidelink message from the second UE to a first UE and a second sidelink message from the third UE to the first UE on a same sidelink channel resource. The adjustment parameter component 1235 may be configured as or otherwise support a means for transmitting, to the second UE, the third UE, or both, at least one indication of one or more power adjustment parameters for adjustment of a transmit power for the first sidelink message, the second sidelink message, or both, based on receiving the power control information.

In some examples, the indication is based on a difference between the first power level and the second power level failing to satisfy a threshold. In some examples, to support receiving the power control information, the power control component 1225 may be configured as or otherwise support a means for receiving, from the first UE, the power control information including an identifier of the first UE, CSI of one or more sidelinks, one or more power measurements, or any combination thereof.

In some examples, to support transmitting the at least one indication, the adjustment parameter component 1235 may be configured as or otherwise support a means for transmitting the at least one indication of a maximum power, a target received power at the first UE, a target transmit power for the first sidelink message, the second sidelink message, or both, or any combination thereof. In some examples, the communications termination component 1240 may be configured as or otherwise support a means for transmitting at least one indication to terminate MU-MIMO communications based on the power control information failing to satisfy one or more thresholds.

Figure 13:
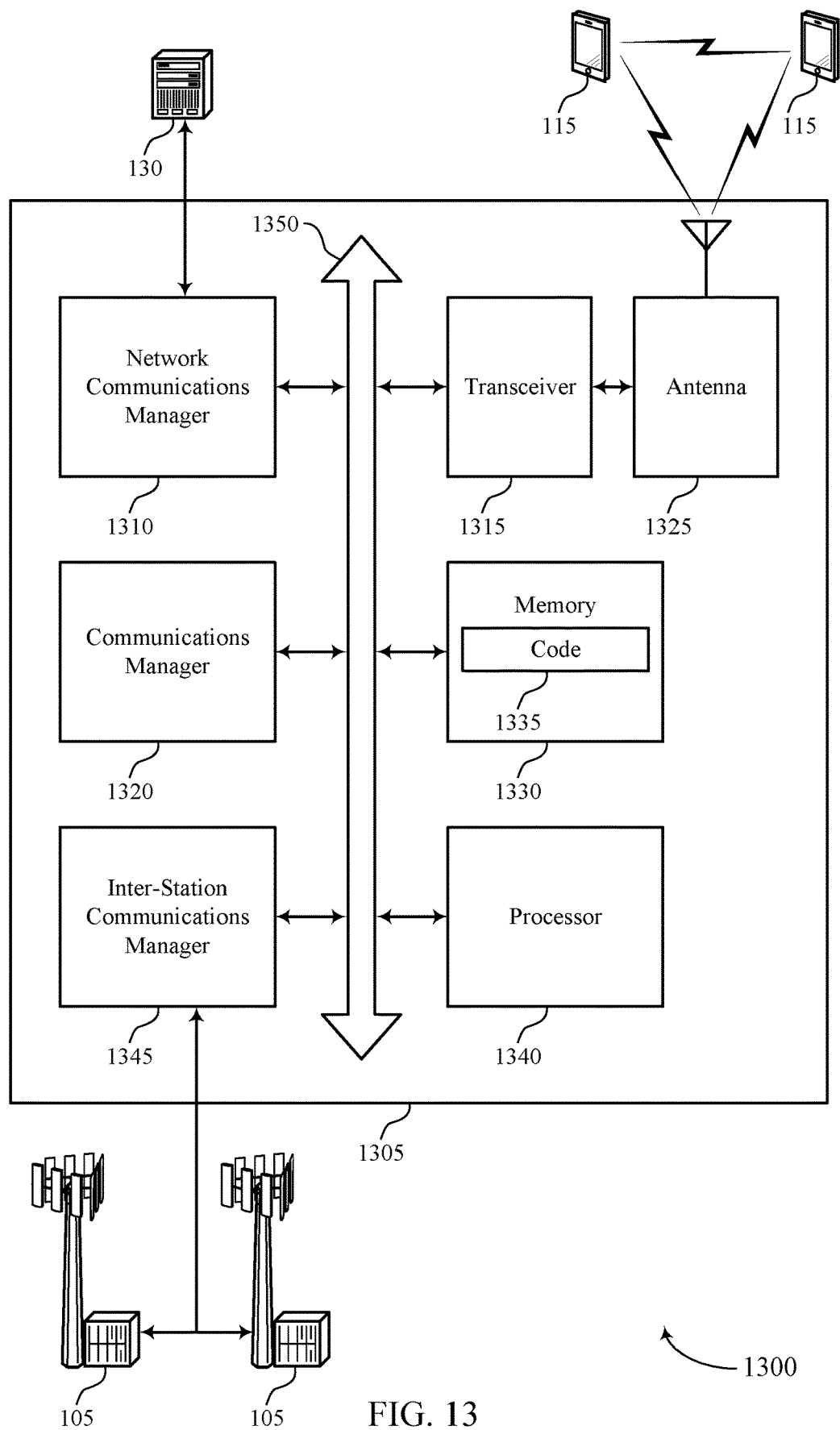
FIG. 13 shows a diagram of a system including a device that supports power control techniques for sidelink communications in accordance with aspects of the present disclosure.

FIG. 13 shows a diagram of a system 1300 including a device 1305 that supports power control techniques for sidelink communications in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting power control techniques for sidelink communications). For example, the device 1305 or a component of the device 1305 may include a processor 1340 and memory 1330 coupled with the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station (e.g., the device 1305) in accordance with examples as disclosed herein. For example, the communications manager 1320 may be configured as or otherwise support a means for receiving power control information associated with a set of sidelinks for communications between a set of UEs (e.g., a set of UEs 115), the set of UEs including at least a second UE and a third UE. The communications manager 1320 may be configured as or otherwise support a means for transmitting a grant scheduling transmission of a first sidelink message from the second UE to a first UE and a second sidelink message from the third UE to the first UE on a same sidelink channel resource. The communications manager 1320 may be configured as or otherwise support a means for transmitting, to the second UE, the third UE, or both, at least one indication of one or more power adjustment parameters for adjustment of a transmit power for the first sidelink message, the second sidelink message, or both, based on receiving the power control information.

By including or configuring the communications manager 1320 in accordance with examples as described herein, the device 1305 may support power control techniques for sidelink communications. For example, the device 1305 may manage the power control at one or more UEs 115, which may result in improved communication reliability, reduced latency, improved user experience related to reduced processing, more efficient utilization of communication resources, improved coordination between devices, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of power control techniques for sidelink communications as described herein, or the processor 1340 and the memory 1330 may be otherwise configured to perform or support such operations.

Figure 14:
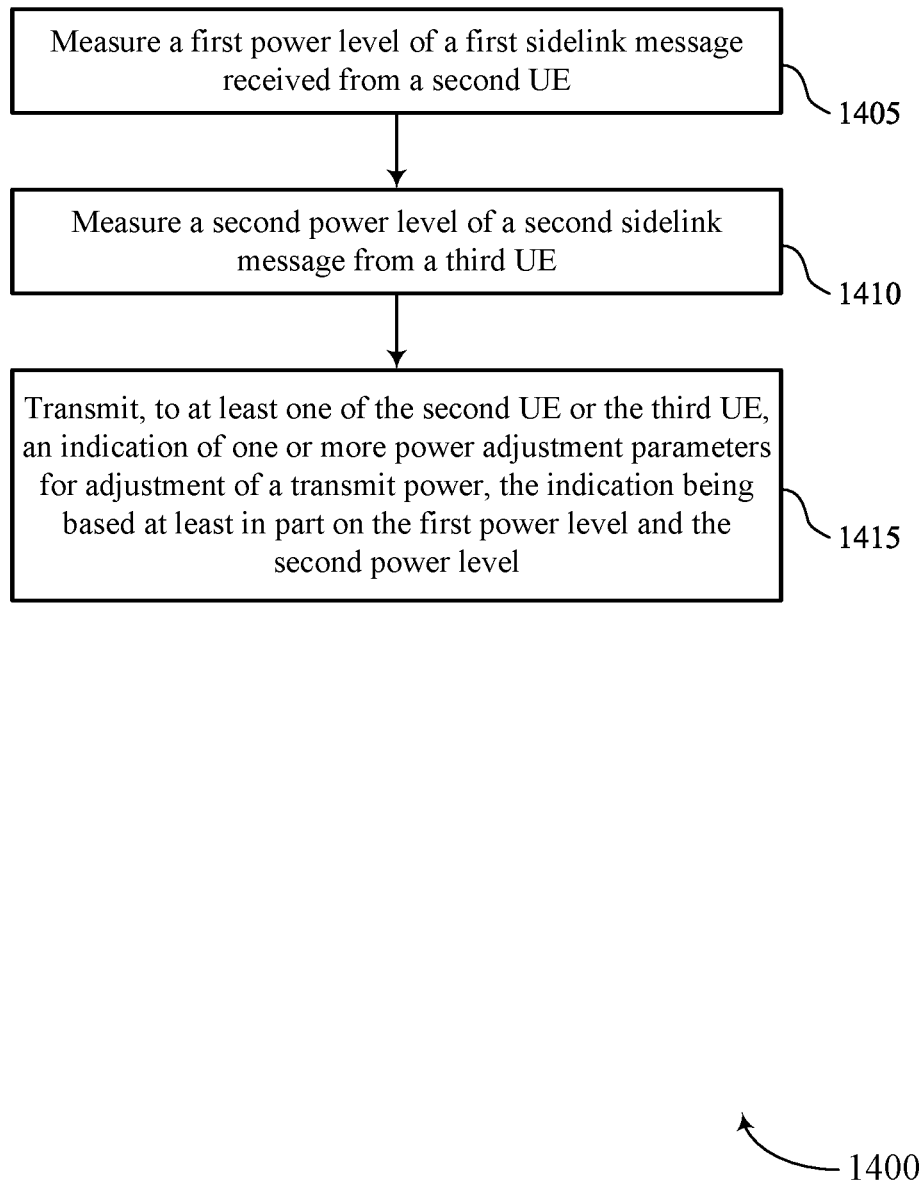
FIGS. 14 through 17 show flowcharts illustrating methods that support power control techniques for sidelink communications in accordance with aspects of the present disclosure.

FIG. 14 shows a flowchart illustrating a method 1400 that supports power control techniques for sidelink communications in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include measuring a first power level of a first sidelink message received from a second UE. The operations of 1405 may be performed in accordance with examples as disclosed herein. In some examples, aspects of the operations of 1405 may be performed by a first power level component 825 as described with reference to FIG. 8.

At 1410, the method may include measuring a second power level of a second sidelink message from a third UE. The operations of 1410 may be performed in accordance with examples as disclosed herein. In some examples, aspects of the operations of 1410 may be performed by a second power level component 830 as described with reference to FIG. 8.

At 1415, the method may include transmitting, to at least one of the second UE or the third UE, an indication of one or more power adjustment parameters for adjustment of a transmit power, the indication being based on the first power level and the second power level. The operations of 1415 may be performed in accordance with examples as disclosed herein. In some examples, aspects of the operations of 1415 may be performed by an indication component 835 as described with reference to FIG. 8.

Figure 15:
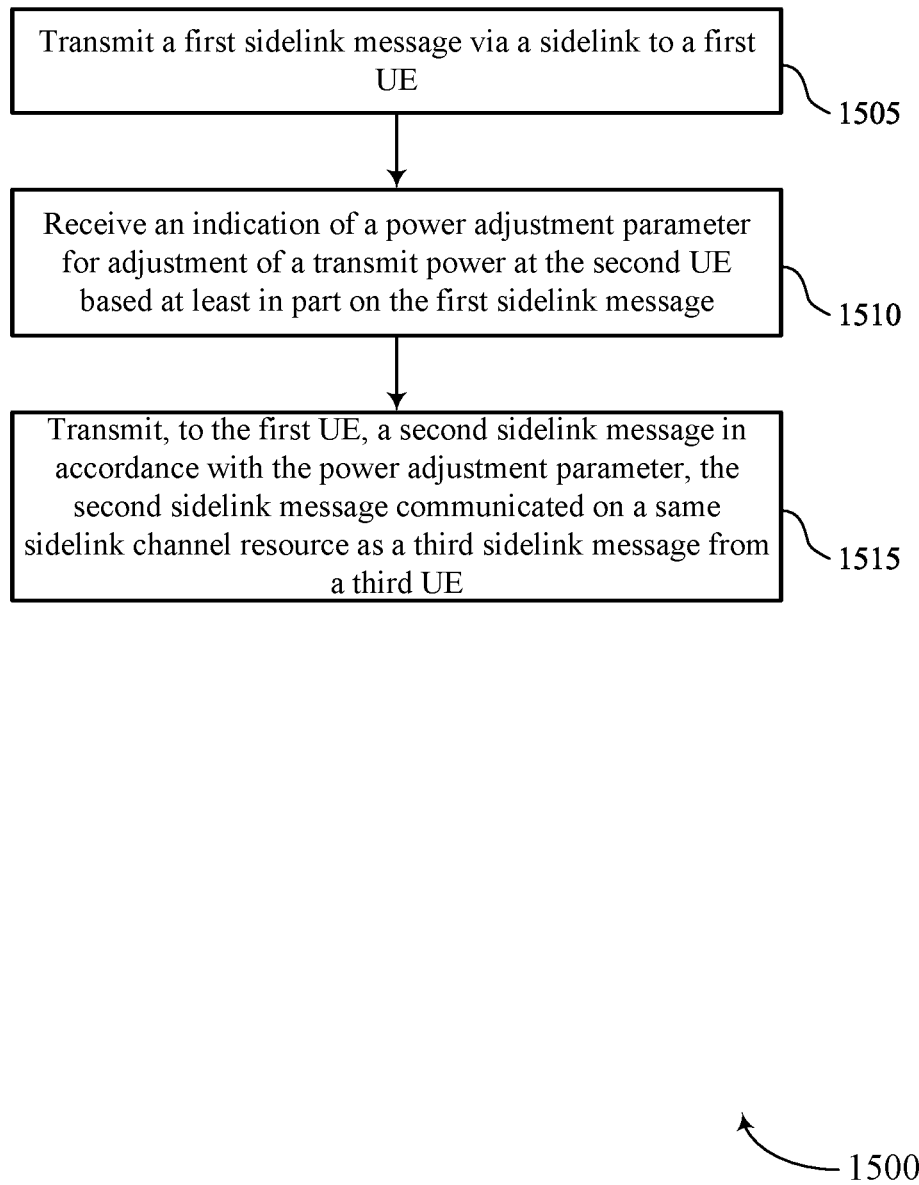

FIG. 15 shows a flowchart illustrating a method 1500 that supports power control techniques for sidelink communications in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting a first sidelink message via a sidelink to a first UE. The operations of 1505 may be performed in accordance with examples as disclosed herein. In some examples, aspects of the operations of 1505 may be performed by a sidelink message component 840 as described with reference to FIG. 8.

At 1510, the method may include receiving an indication of a power adjustment parameter for adjustment of a transmit power at the second UE based on the first sidelink message. The operations of 1510 may be performed in accordance with examples as disclosed herein. In some examples, aspects of the operations of 1510 may be performed by an indication component 835 as described with reference to FIG. 8.

At 1515, the method may include transmitting, to the first UE, a second sidelink message in accordance with the power adjustment parameter, the second sidelink message communicated on a same sidelink channel resource as a third sidelink message from a third UE. The operations of 1515 may be performed in accordance with examples as disclosed herein. In some examples, aspects of the operations of 1515 may be performed by a sidelink message component 840 as described with reference to FIG. 8.

Figure 16:
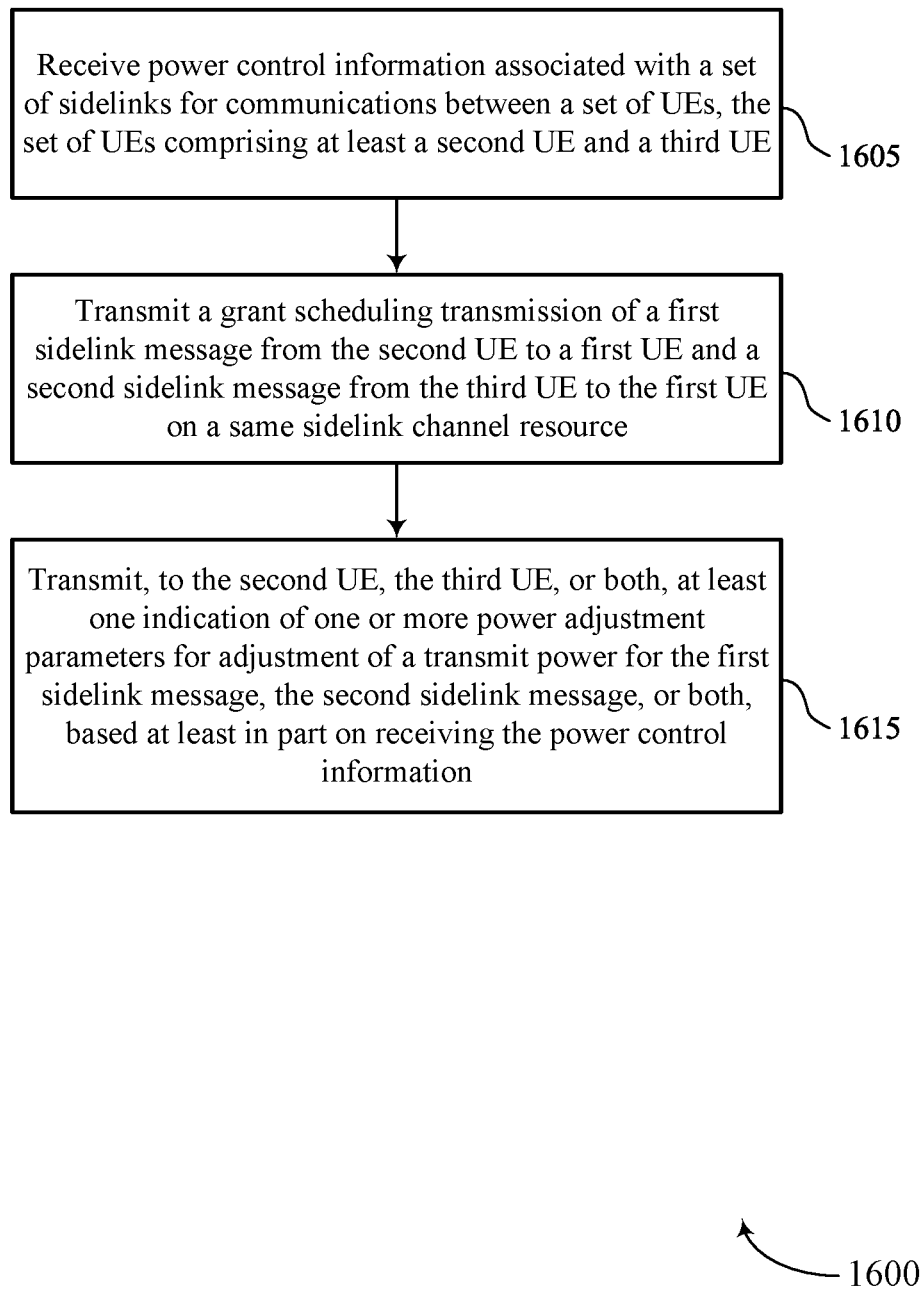

FIG. 16 shows a flowchart illustrating a method 1600 that supports power control techniques for sidelink communications in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1605, the method may include receiving power control information associated with a set of sidelinks for communications between a set of UEs, the set of UEs including at least a second UE and a third UE. The operations of 1605 may be performed in accordance with examples as disclosed herein. In some examples, aspects of the operations of 1605 may be performed by a power control component 1225 as described with reference to FIG. 12.

At 1610, the method may include transmitting a grant scheduling transmission of a first sidelink message from the second UE to a first UE and a second sidelink message from the third UE to the first UE on a same sidelink channel resource. The operations of 1610 may be performed in accordance with examples as disclosed herein. In some examples, aspects of the operations of 1610 may be performed by a grant scheduling component 1230 as described with reference to FIG. 12.

At 1615, the method may include transmitting, to the second UE, the third UE, or both, at least one indication of one or more power adjustment parameters for adjustment of a transmit power for the first sidelink message, the second sidelink message, or both, based on receiving the power control information. The operations of 1615 may be performed in accordance with examples as disclosed herein. In some examples, aspects of the operations of 1615 may be performed by an adjustment parameter component 1235 as described with reference to FIG. 12.

Figure 17:
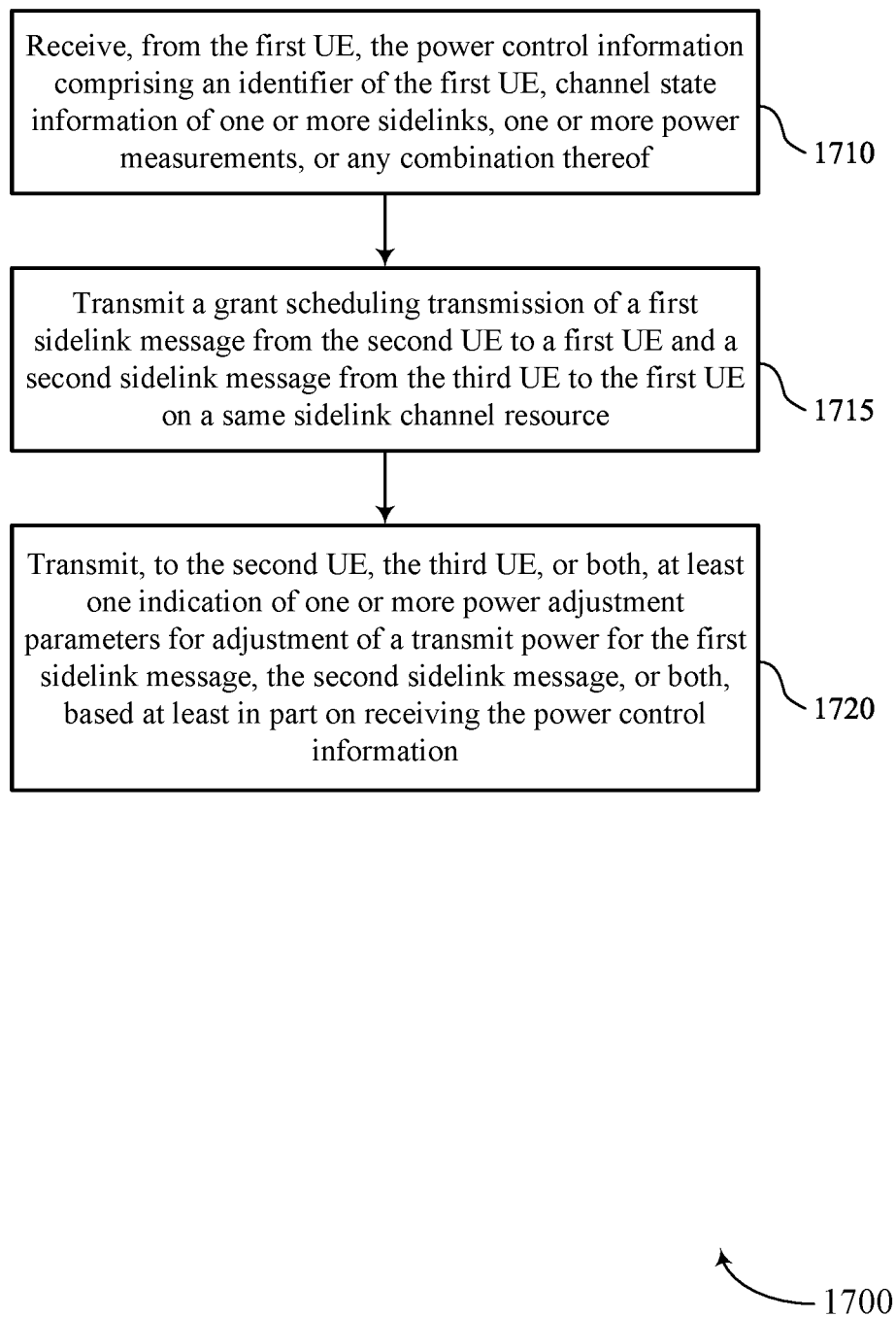

FIG. 17 shows a flowchart illustrating a method 1700 that supports power control techniques for sidelink communications in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1710, the method may include receiving, from the first UE, the power control information including an identifier of the first UE, CSI of one or more sidelinks, one or more power measurements, or any combination thereof. The operations of 1710 may be performed in accordance with examples as disclosed herein. In some examples, aspects of the operations of 1710 may be performed by a power control component 1225 as described with reference to FIG. 12.

At 1715, the method may include transmitting a grant scheduling transmission of a first sidelink message from the second UE to a first UE and a second sidelink message from the third UE to the first UE on a same sidelink channel resource. The operations of 1715 may be performed in accordance with examples as disclosed herein. In some examples, aspects of the operations of 1715 may be performed by a grant scheduling component 1230 as described with reference to FIG. 12.

At 1720, the method may include transmitting, to the second UE, the third UE, or both, at least one indication of one or more power adjustment parameters for adjustment of a transmit power for the first sidelink message, the second sidelink message, or both, based on receiving the power control information. The operations of 1720 may be performed in accordance with examples as disclosed herein. In some examples, aspects of the operations of 1720 may be performed by an adjustment parameter component 1235 as described with reference to FIG. 12.

The following provides an overview of aspects of the present disclosure:

Aspect 1: A method for wireless communications at a first UE, comprising: measuring a first power level of a first sidelink message received from a second UE; measuring a second power level of a second sidelink message from a third UE; and transmitting, to at least one of the second UE or the third UE, an indication of one or more power adjustment parameters for adjustment of a transmit power, the indication being based at least in part on the first power level and the second power level.

Aspect 2: The method of aspect 1, wherein the indication is based in part on a difference between the first power level and the second power level failing to satisfy a threshold.

Aspect 3: The method of any of aspects 1 through 2, wherein transmitting the indication comprises: transmitting an indication of a first power adjustment parameter for the adjustment of the transmit power relative to an initial transmit power, or relative to a second power adjustment parameter, or a combination thereof.

Aspect 4: The method of aspect 1, further comprising: communicating an indication to terminate MU-MIMO communications based at least in part on a power control failure.

Aspect 5: The method of aspect 4, wherein communicating the indication to terminate the MU-MIMO communications comprises: transmitting the indication to terminate the MU-MIMO communications to the second UE, the third UE, or both; or receiving the indication to terminate the MU-MIMO communications from a base station.

Aspect 6: The method of any of aspects 4 through 5, wherein the indication to terminate the MU-MIMO communications comprises a bit corresponding to a respective UE indicating to transmit on a same sidelink channel resource or to refrain from transmitting on the same sidelink channel resource.

Aspect 7: The method of any of aspects 1 through 6, further comprising: receiving the first sidelink message indicating first power control information, the first power control information comprising a first power headroom of the second UE, a sidelink transmit power of the second UE, a maximum sidelink transmit power of the second UE, or any combination thereof; and receiving the second sidelink message indicating second power control information, the second power control information comprising a second power headroom of the third UE, a sidelink transmit power of the third UE, a maximum sidelink transmit power of the third UE, or any combination thereof, wherein transmitting the indication of the one or more power adjustment parameters is based at least in part on the first power control information and the second power control information.

Aspect 8: The method of any of aspects 1 through 7, further comprising: receiving the first sidelink message and the second sidelink message via dedicated sidelink shared channel resources, sidelink MAC-CEs, SCI, or any combination thereof.

Aspect 9: The method of any of aspects 1 through 8, wherein transmitting the indication comprises: transmitting, to the third UE, the indication based at least in part on the second UE initiating a third sidelink message before an initiation of a fourth sidelink message from the third UE.

Aspect 10: The method of any of aspects 1 through 9, wherein transmitting the indication comprises: transmitting the indication via dedicated sidelink shared channel resources, sidelink feedback channel resources, or any combination thereof.

Aspect 11: A method for wireless communications at a second UE, comprising: transmitting a first sidelink message via a sidelink to a first UE; receiving an indication of a power adjustment parameter for adjustment of a transmit power at the second UE based at least in part on the first sidelink message; and transmitting, to the first UE, a second sidelink message in accordance with the power adjustment parameter, the second sidelink message communicated on a same sidelink channel resource as a third sidelink message from a third UE.

Aspect 12: The method of aspect 11, wherein transmitting the second sidelink message comprises: transmitting the second sidelink message associated with a first power level, wherein a difference between the first power level and a second power level associated with the third sidelink message satisfies a threshold based at least in part on receiving the indication.

Aspect 13: The method of any of aspects 11 through 12, wherein receiving the indication comprises: receiving an indication of a first power adjustment parameter for the adjustment of the transmit power relative to an initial transmit power or relative to a second power adjustment parameter or a combination thereof.

Aspect 14: The method of aspect 11, further comprising: receiving, from the first UE or a base station, an indication to terminate MU-MIMO communications based at least in part on a power control failure.

Aspect 15: The method of aspect 14, wherein the indication to terminate the MU-MIMO communications comprises a bit corresponding to a respective UE indicating to transmit on the same sidelink channel resource or to refrain from transmitting on the same sidelink channel resource.

Aspect 16: The method of any of aspects 11 through 15, wherein transmitting the first sidelink message comprises: transmitting the first sidelink message indicating power control information, the power control information comprising a power headroom of the second UE, a sidelink transmit power of the second UE, a maximum sidelink transmit power of the second UE, or any combination thereof.

Aspect 17: The method of any of aspects 11 through 16, wherein transmitting the first sidelink message comprises: transmitting the first sidelink message via dedicated sidelink shared channel resources, sidelink MAC-CEs, SCI, or any combination thereof.

Aspect 18: The method of any of aspects 11 through 17, wherein receiving the indication comprises: receiving, from the first UE, the indication based at least in part on the third UE initiating the third sidelink message before an initiation of the second sidelink message.

Aspect 19: The method of any of aspects 11 through 18, wherein receiving the indication comprises: receiving the indication via dedicated sidelink shared channel resources, sidelink feedback channel resources, or any combination thereof.

Aspect 20: A method for wireless communications at a base station, comprising: receiving power control information associated with a set of sidelinks for communications between a set of UEs, the set of UEs comprising at least a second UE and a third UE; transmitting a grant scheduling transmission of a first sidelink message from the second UE to a first UE and a second sidelink message from the third UE to the first UE on a same sidelink channel resource; and transmitting, to the second UE, the third UE, or both, at least one indication of one or more power adjustment parameters for adjustment of a transmit power for the first sidelink message, the second sidelink message, or both, based at least in part on receiving the power control information.

Aspect 21: The method of aspect 20, wherein the indication is based at least in part on a difference between the first power level and the second power level failing to satisfy a threshold.

Aspect 22: The method of any of aspects 20 through 21, wherein receiving the power control information comprises: receiving, from the first UE, the power control information comprising an identifier of the first UE, channel state information of one or more sidelinks, one or more power measurements, or any combination thereof.

Aspect 23: The method of any of aspects 20 through 22, wherein transmitting the at least one indication comprises: transmitting the at least one indication of a maximum power, a target received power at the first UE, a target transmit power for the first sidelink message, the second sidelink message, or both, or any combination thereof.

Aspect 24: The method of aspect 20, further comprising: transmitting at least one indication to terminate MU-MIMO communications based at least in part on the power control information failing to satisfy one or more thresholds.

Aspect 25: An apparatus for wireless communications at a first UE, comprising a processor; memory coupled with the processor; and instructions stored in the memory and executable by the processor to cause the apparatus to perform a method of any of aspects 1 through 10.

Aspect 26: An apparatus for wireless communications at a first UE, comprising at least one means for performing a method of any of aspects 1 through 10.

Aspect 27: A non-transitory computer-readable medium storing code for wireless communications at a first UE, the code comprising instructions executable by a processor to perform a method of any of aspects 1 through 10.

Aspect 28: An apparatus for wireless communications at a second UE, comprising a processor; memory coupled with the processor; and instructions stored in the memory and executable by the processor to cause the apparatus to perform a method of any of aspects 11 through 19.

Aspect 29: An apparatus for wireless communications at a second UE, comprising at least one means for performing a method of any of aspects 11 through 19.

Aspect 30: A non-transitory computer-readable medium storing code for wireless communications at a second UE, the code comprising instructions executable by a processor to perform a method of any of aspects 11 through 19.

Aspect 31: An apparatus for wireless communications at a base station, comprising a processor; memory coupled with the processor; and instructions stored in the memory and executable by the processor to cause the apparatus to perform a method of any of aspects 20 through 24.

Aspect 32: An apparatus for wireless communications at a base station, comprising at least one means for performing a method of any of aspects 20 through 24.

Aspect 33: A non-transitory computer-readable medium storing code for wireless communications at a base station, the code comprising instructions executable by a processor to perform a method of any of aspects 20 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions. As used herein, "satisfying a threshold" may, depending on the context, refer to a value being greater than the threshold, greater than or equal to the threshold, less than the threshold, less than or equal to the threshold, equal to the threshold, not equal to the threshold, or the like.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   one or more processors;
   memory coupled with the one or more processors; and
   instructions stored in the memory and executable by the one or more processors to cause the apparatus to:
      measure a first power level of a first sidelink message received from a second UE;
      measure a second power level of a second sidelink message from a third UE;
      transmit, to at least one of the second UE or the third UE, an indication of one or more power adjustment parameters for adjustment of a transmit power, the indication being based at least in part on the first power level and the second power level,
         wherein the indication is based at least in part on a difference between the first power level of the first sidelink message received from the second UE and the second power level of the second sidelink message from the third UE exceeding a threshold; and
      communicate an indication to terminate multiple user multiple input multiple output communications based at least in part on a power control failure,
         wherein the indication to terminate the multiple user multiple input multiple output communications comprises a bit corresponding to a respective UE indicating to transmit on a same sidelink channel resource or to refrain from transmitting on the same sidelink channel resource.

2. The apparatus of claim 1, wherein the instructions to transmit the indication are executable by the one or more processors to cause the apparatus to:
   transmit an indication of a first power adjustment parameter for the adjustment of the transmit power relative to an initial transmit power, or relative to a second power adjustment parameter, or a combination thereof.

3. The apparatus of claim 1, wherein the instructions to communicate the indication to terminate the multiple user multiple input multiple output communications are executable by the one or more processors to cause the apparatus to:
   transmit the indication to terminate the multiple user multiple input multiple output communications to the second UE, the third UE, or both; or
   receive the indication to terminate the multiple user multiple input multiple output communications from a network entity.

4. The apparatus of claim 1, wherein the instructions are further executable by the one or more processors to cause the apparatus to:
   receive the first sidelink message indicating first power control information, the first power control information comprising a first power headroom of the second UE, a sidelink transmit power of the second UE, a maximum sidelink transmit power of the second UE, or any combination thereof; and
   receive the second sidelink message indicating second power control information, the second power control information comprising a second power headroom of the third UE, a sidelink transmit power of the third UE, a maximum sidelink transmit power of the third UE, or any combination thereof, wherein transmitting the indication of the one or more power adjustment parameters is based at least in part on the first power control information and the second power control information.

5. The apparatus of claim 1, wherein the instructions are further executable by the one or more processors to cause the apparatus to:
   receive the first sidelink message and the second sidelink message via dedicated sidelink shared channel resources, sidelink medium access control elements, sidelink control information, or any combination thereof.

6. The apparatus of claim 1, wherein the instructions to transmit the indication are executable by the one or more processors to cause the apparatus to:
   transmit, to the third UE, the indication based at least in part on the second UE initiating a third sidelink message before an initiation of a fourth sidelink message from the third UE.

7. The apparatus of claim 1, wherein the instructions to transmit the indication are executable by the one or more processors to cause the apparatus to:

transmit the indication via dedicated sidelink shared channel resources, sidelink feedback channel resources, or any combination thereof.

8. An apparatus for wireless communications at a second user equipment (UE), comprising:
one or more processors;
memory coupled with the one or more processors; and
instructions stored in the memory and executable by the one or more processors to cause the apparatus to:
transmit a first sidelink message via a sidelink to a first UE;
receive an indication of a power adjustment parameter for adjustment of a transmit power at the second UE based at least in part on a first power level associated with the first sidelink message and a second power level associated with a third UE,
wherein the indication is based at least in part on a difference between the first power level associated with the first sidelink message and the second power level associated with the third UE exceeding a threshold;
transmit, to the first UE, a second sidelink message in accordance with the power adjustment parameter, the second sidelink message communicated on a same sidelink channel resource as a third sidelink message from the third UE; and
receive, from the first UE or a network entity, an indication to terminate multiple user multiple input multiple output communications based at least in part on a power control failure,
wherein the indication to terminate the multiple user multiple input multiple output communications comprises a bit corresponding to a respective UE indicating to transmit on the same sidelink channel resource or to refrain from transmitting on the same sidelink channel resource.

9. The apparatus of claim 8, wherein the instructions to transmit the second sidelink message are executable by the one or more processors to cause the apparatus to:
transmit the second sidelink message associated with a third power level, wherein a difference between the third power level and a fourth power level associated with the third sidelink message satisfies a second threshold based at least in part on receiving the indication.

10. The apparatus of claim 8, wherein the instructions to receive the indication are executable by the one or more processors to cause the apparatus to:
receive an indication of a first power adjustment parameter for the adjustment of the transmit power relative to an initial transmit power, relative to a second power adjustment parameter, or a combination thereof.

11. The apparatus of claim 8, wherein the instructions to transmit the first sidelink message are executable by the one or more processors to cause the apparatus to:
transmit the first sidelink message indicating power control information, the power control information comprising a power headroom of the second UE, a sidelink transmit power of the second UE, a maximum sidelink transmit power of the second UE, or any combination thereof.

12. The apparatus of claim 8, wherein the instructions to transmit the first sidelink message are executable by the one or more processors to cause the apparatus to:
transmit the first sidelink message via dedicated sidelink shared channel resources, sidelink medium access control elements, sidelink control information, or any combination thereof.

13. The apparatus of claim 8, wherein the instructions to receive the indication are executable by the one or more processors to cause the apparatus to:
receive, from the first UE, the indication based at least in part on the third UE initiating the third sidelink message before an initiation of the second sidelink message.

14. The apparatus of claim 8, wherein the instructions to receive the indication are executable by the one or more processors to cause the apparatus to:
receive the indication via dedicated sidelink shared channel resources, sidelink feedback channel resources, or any combination thereof.

15. A method for wireless communications at a first user equipment (UE), comprising:
measuring a first power level of a first sidelink message received from a second UE;
measuring a second power level of a second sidelink message from a third UE;
transmitting, to at least one of the second UE or the third UE, an indication of one or more power adjustment parameters for adjustment of a transmit power, the indication being based at least in part on the first power level and the second power level,
wherein the indication is based at least in part on a difference between the first power level of the first sidelink message received from the second UE and the second power level of the second sidelink message from the third UE exceeding a threshold; and
communicating an indication to terminate multiple user multiple input multiple output communications based at least in part on a power control failure
wherein the indication to terminate the multiple user multiple input multiple output communications comprises a bit corresponding to a respective UE indicating to transmit on a same sidelink channel resource or to refrain from transmitting on the same sidelink channel resource.

16. The method of claim 15, wherein transmitting the indication comprises:
transmitting an indication of a first power adjustment parameter for the adjustment of the transmit power relative to an initial transmit power, or a second power adjustment parameter, or a combination thereof.

17. The method of claim 15, wherein communicating the indication to terminate the multiple user multiple input multiple output communications comprises:
transmitting the indication to terminate the multiple user multiple input multiple output communications to the second UE, the third UE, or both; or
receiving the indication to terminate the multiple user multiple input multiple output communications from a network entity.

* * * * *